(12) United States Patent
Elkhou et al.

(10) Patent No.: US 11,574,023 B2
(45) Date of Patent: *Feb. 7, 2023

(54) DOCUMENT PROCESSING SYSTEM AND METHOD

(71) Applicant: ONNA TECHNOLOGIES, INC., New York, NY (US)

(72) Inventors: Salim Elkhou, Los Angeles, CA (US); Aditya Khatkhate, Los Angeles, CA (US)

(73) Assignee: ONNA TECHNOLOGIES, INC., New York, NY (US)

( * ) Notice: Subject to any disclaimer, the term of this patent is extended or adjusted under 35 U.S.C. 154(b) by 528 days.

This patent is subject to a terminal disclaimer.

(21) Appl. No.: 16/560,643

(22) Filed: Sep. 4, 2019

(65) Prior Publication Data

US 2020/0081924 A1 Mar. 12, 2020

Related U.S. Application Data

(63) Continuation of application No. 14/441,655, filed as application No. PCT/US2014/024863 on Mar. 12, (Continued)

(51) Int. Cl.
G06F 16/30 (2019.01)
G06F 16/93 (2019.01)
(Continued)

(52) U.S. Cl.
CPC ............ *G06F 16/93* (2019.01); *G06F 3/0482* (2013.01); *G06F 3/04842* (2013.01);
(Continued)

(58) Field of Classification Search
CPC . G06F 6/30; G06F 6/3328; G06F 6/93; G06F 6/9535
See application file for complete search history.

(56) References Cited

U.S. PATENT DOCUMENTS 6,286,002 B1 * 9/2001 Axaopoulos ....... G06Q 30/0633
707/999.1
8,577,911 B1 * 11/2013 Stepinski ............ G06F 16/3325
707/765

(Continued)

OTHER PUBLICATIONS

International Preliminary Report and Written Opinion for PCT/US2014/024863 dated Jul. 28, 2014.
International Search Report PCT/US2014/024863 dated Jul. 28, 2014.
Global Patent Literature Text Search, dated Jul. 5, 2014, for PCT/US2014/024863 dated Jul. 28, 2014.

*Primary Examiner* — Sana A Al-Hashemi
(74) *Attorney, Agent, or Firm* — Finnegan, Henderson, Farabow, Garrett & Dunner LLP

(57) ABSTRACT

There is provided a method for processing electronic documents. The method includes: receiving a plurality of electronic documents stored in a file container created based on a file system; retrieving metadata from the file container, the metadata indicating forensic information about the plurality of electronic documents; applying an interactive filtering to the metadata according to user inputs; and selectively extracting one or more electronic documents from the file container according to results of the interactive filtering.

19 Claims, 21 Drawing Sheets

Related U.S. Application Data

2014, now abandoned, which is a continuation-in-part of application No. 13/842,681, filed on Mar. 15, 2013, now Pat. No. 9,753,920.

(60) Provisional application No. 61/800,008, filed on Mar. 15, 2013.

(51) Int. Cl.
*G06F 3/0482* (2013.01)
*G06F 3/04842* (2022.01)
*G06F 16/9535* (2019.01)
*G06Q 50/18* (2012.01)
*G06Q 10/10* (2023.01)

(52) U.S. Cl.
CPC ......... *G06F 16/9535* (2019.01); *G06Q 10/10* (2013.01); *G06Q 50/18* (2013.01)

(56) References Cited

U.S. PATENT DOCUMENTS

| | | |
|---|---|---|
| 2006/0123022 A1 | 6/2006 | Bird |
| 2007/0226204 A1* | 9/2007 | Feldman ................. G06F 16/30 |
| | | 707/999.005 |
| 2009/0044024 A1* | 2/2009 | Oberheide ............ H04L 63/145 |
| | | 713/188 |
| 2009/0288164 A1 | 11/2009 | Adelstein et al. |
| 2010/0205020 A1 | 8/2010 | Losey |
| 2010/0332475 A1* | 12/2010 | Birdwell ........... G06F 16/24578 |
| | | 707/E17.014 |
| 2011/0040600 A1* | 2/2011 | Paknad .................. G06Q 50/18 |
| | | 705/7.42 |
| 2011/0295863 A1 | 12/2011 | Weir et al. |
| 2012/0260304 A1* | 10/2012 | Morris .................... H04L 63/14 |
| | | 726/1 |

* cited by examiner

| BILLABLE TASK | APPROVED TASKS | UN-INVOICED TASKS | | | | | | | | | | |
|---|---|---|---|---|---|---|---|---|---|---|---|---|

BILLABLE TASK(S)  TOTAL: $31,232.88

| TASK ID | CLIENT NAME | PROJECT NAME | TASK NAME | SERVICE NAME | BILLING DATE | BILLED HOUR | BILLED SIZE | BILLED COUNT | SERVICE PRICE | DESCRIPTION | BILLED AMOUNT | ASSIGNED TO | EDIT | APPROVE |
|---|---|---|---|---|---|---|---|---|---|---|---|---|---|---|
| 65 | E-STET | JGTEST | TASK CREATION WORKS | ESI PRODUCTION | 09/14/2013 | 0.00 | 0.00 | 0 | $150.11 | | $0.00 | JGOLAD@E-STET.COM | EDIT | APPROVE |
| 66 | E-STET | JGTEST | 09TESTBILLING | CD | 09/26/2013 | 0.00 | 0.00 | 199 | $150.00 | | $29,871.89 | JGOLAD@E-STET.COM | EDIT | APPROVE |
| 143 | E-STET | JGTEST | UNITIZATION | UNITIZATION | 10/17/2013 | 0.00 | 0.00 | 100 | $0.10 | UNITZ | $10.00 | JGOLAD@E-STET.COM | EDIT | APPROVE |
| 257 | E-STET | JGTEST | TESTING FANCY FONTS | CD | 10/23/2013 | 0.00 | 0.00 | 6 | $150.11 | THIS LINE WILL BE BOLD AND THIS ONE IN ITALICS. THIS LINE WILL BE CENTERED. THIS LINE WILL BE COURIER AND RIGHT JUSTIFIED AND IN GREY? | $900.66 | JGOLAD@E-STET.COM | EDIT | APPROVE |
| 406 | E-STET | JGTEST | DO NOT APPROVE TASK | FULL PROCESSING | 11/28/2013 | 0.00 | 3.00 | 0 | $150.11 | | $450.33 | JGOLAD@E-STET.COM | EDIT | APPROVE |
| | | | | | | | | | | TOTAL: | $31,232.88 | | | |

*FIG. 16*

BILLABLE TASK | APPROVED TASKS | UN-INVOICED TASKS

UN-INVOICED TASK(S)                                                                                           TOTAL: $3,321.93

| TASK ID | CLIENT NAME | PROJECT NAME | TASK NAME | SERVICE NAME | COMPLETED BY | BILLING DATE | BILLED COUNT | BILLING PRICE | DESCRIPTION | BILLED AMOUNT | APPROVED BY | APPROVED ON |
|---------|-------------|--------------|-----------|--------------|--------------|--------------|--------------|---------------|-------------|---------------|-------------|-------------|
| 256 | E-STET | JGTEST | TESTING DECEMBER BILLING DATE | FORENSIC ACQUISITION | JONATHAN GOLAD | 12/5/2013 | 1 | $750.00 | TESTING DECEMBER BILLING DATE | $750.00 | JONATHAN GOLAD | 11/4/2013 2:58 PM |
| 144 | E-STET | JGTEST | SCAN HEAVY | SCANNING - HEAVY | JONATHAN GOLAD | 10/17/2013 | 108 | $0.20 | TESTING | $21.60 | JONATHAN GOLAD | 11/4/2013 2:58 PM |
| 69 | E-STET | JGTEST | WORKBILLING | BACKUP TAPE CATALOGING | JONATHAN GOLAD | 9/27/2013 | 14 | $150.00 | TEST453789 | $2,100.00 | JONATHAN GOLAD | 11/4/2013 2:58 PM |
| 407 | E-STET | JGTEST | DNA 2 | PARTIAL PROCESSING | JONATHAN GOLAD | 11/29/2013 | 3 | $150.11 | | $450.33 | JONATHAN GOLAD | 2/28/2014 2:38 PM |
| | | | | | | | | | TOTAL: | $3,321.93 | | |

FIG. 17

DOCUMENT PROCESSING SYSTEM AND METHOD

CROSS-REFERENCE TO RELATED APPLICATIONS

This application is a continuation of U.S. patent application Ser. No. 14/441,655, filed Nov. 21, 2017, which claims the benefit of priority to U.S. application Ser. No. 13/842,681, filed Mar. 15, 2013, and U.S. Provisional Application No. 61/800,008, filed Mar. 15, 2013, the entireties of which are incorporated by references.

FIELD OF THE INVENTION

This disclosure relates to system and method for document processing in general and electronic discovery in particular.

BACKGROUND

Identifying and discovering relevant information from a large pool of electronic data is a challenging task. For example, in a discovery process of a litigation case, parties often exchange a great deal of information in electronic format as required by local law or by mutual agreement. Before being turned over to the opposing party, the electronic documents must be reviewed for relevance and screened for privilege. After a document is identified as potentially relevant, it is further reviewed for privilege. Evidence may then be extracted from the relevant electronic documents and further analyzed. Documents may be reviewed either as native files or converted to other forms, such as PDF or TIFF files.

Failure to provide relevant information or inadvertently providing privileged information to the opposing party may subject a party to court sanctions or even adverse judgments. Parties involved in litigation and their counsel typically invest substantial time and effort in reviewing and screening electronic data. The amount of electronic data that must be processed and produced can be overwhelming, raising litigation costs and causing delays in proceedings. When a party discovers later during a case that additional information must be discovered or submitted, the trial may be delayed or interrupted to take additional discovery. The parties must invest additional time and labor in processing and producing the new information.

The infrastructure and resources needed to perform these tasks efficiently is expensive. Maintaining this capability across thousands of individual law firms is duplicative, expensive, and wasteful. Consolidation of these services in a smaller, specialized vendor population may be more efficient and save the client money and provide additional expertise. There remains a need to efficiently and precisely identify relevant information from a large amount of electronic data at an early stage. It is also desired to free parties and their attorneys from burdensome discovery tasks, while allowing the parties and their attorneys to have real-time control of the discovery process.

SUMMARY

According to a first aspect of the present disclosure, there is provided a system and method for processing electronic documents. The method includes: receiving a plurality of electronic documents stored in a file container created based on a file system; retrieving metadata from the file container, the metadata indicating forensic information about the plurality of electronic documents; applying an interactive filtering to the metadata according to user inputs; and selectively extracting one or more electronic documents from the file container according to results of the interactive filtering.

According to a second aspect of the present disclosure, there is provided a computer-readable medium including instructions, which, when executed by a processor, cause the processor to perform a method for processing electronic documents. The method comprises: receiving a plurality of electronic documents stored in a file container created based on a file system; retrieving metadata from the file container, the metadata indicating forensic information about the plurality of electronic documents; applying an interactive filtering to the metadata according to user inputs; and selectively extracting one or more electronic documents from the file container according to results of the interactive filtering.

According to a third aspect of the present disclosure, there is provided a computer system for processing electronic documents. The computer system includes a storage medium for storing computer instructions for processing a plurality of electronic documents and a processor for executing the computer instructions. The computer instructions cause the processor to: receive a plurality of electronic documents stored in a file container created based on a file system; retrieve metadata from the file container, the metadata indicating forensic information about the plurality of electronic documents; apply an interactive filtering to the metadata according to user inputs; and selectively extract one or more electronic documents from the file container according to results of the interactive filtering.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

FIGS. 11-17 illustrate exemplary user interfaces for document processing generated by the system of FIG. 1, according to some embodiments.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description are exemplary only and are not exhaustive of all possible implementations consistent with the invention. Instead, they are merely examples of systems and methods consistent with aspects related to the invention as recited in the appended claims.

Figure 1:
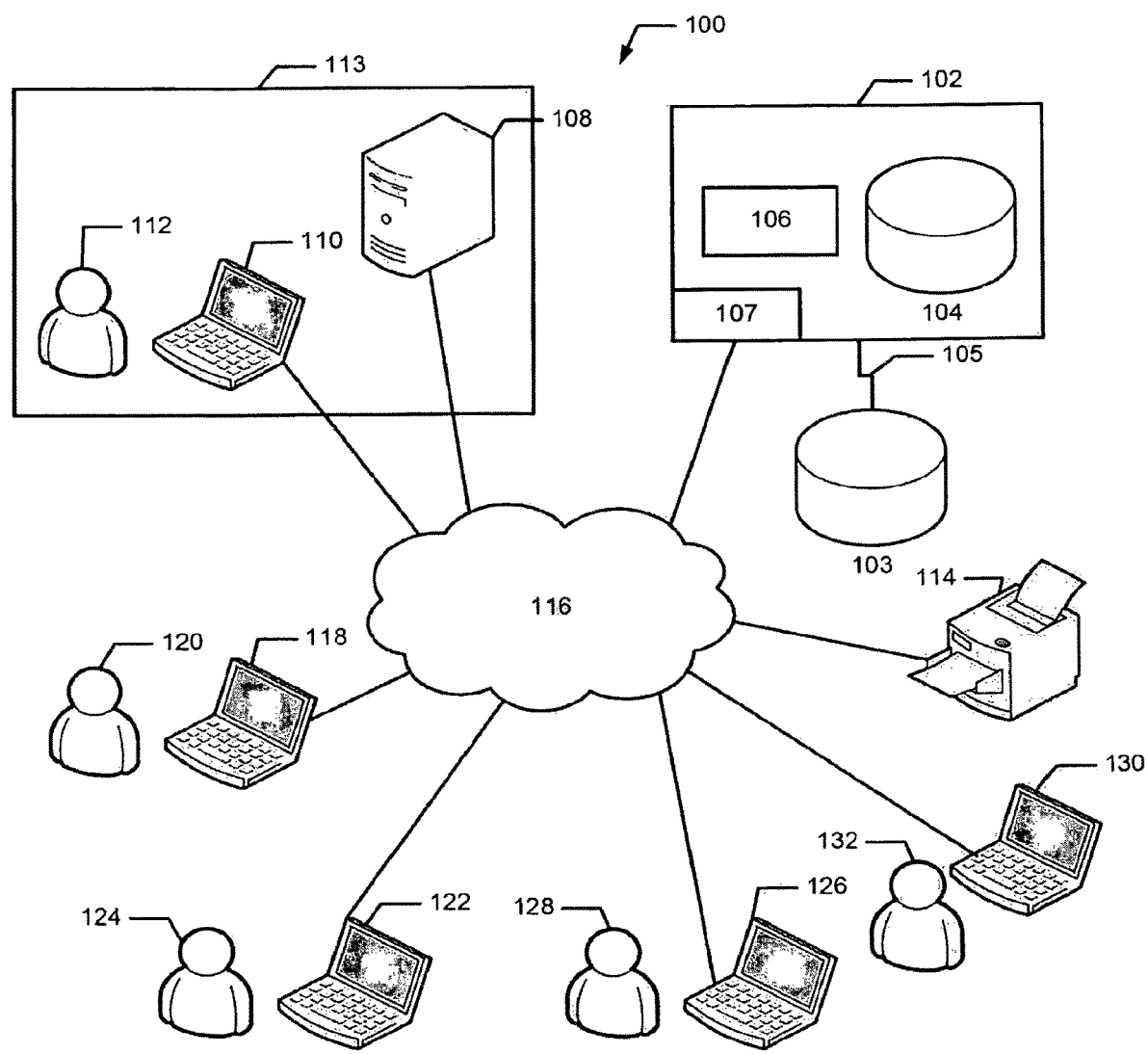
FIG. 1 is a block diagram of an exemplary embodiment of a system for processing electronic documents.

FIG. 1 illustrates a diagram of an exemplary embodiment of system 100 for automatic document processing. System 100 includes processing server 102 configured to collect electronic documents from entities, such as companies, organizations, firms, businesses, etc. Server 102 is further configured to interact with users through user interfaces and process the electronic documents according to inputs from the users. For example, the server 102 may catalog, classify, or filter the electronic documents at the requests of the users. Server 102 may also provide billing or task management functionalities that allow multiple parties to collaborate within a project.

According to a further embodiment, server 102 includes storage medium 104, such as a hard drive, a RAM, a ROM, a flash drive, a CD-ROM, a DVD-ROM, or other storage devices known in the art. Storage medium 104 may store the electronic documents collected from other entities and data relevant to the processing of the electronic documents. Storage medium 104 may also include computer-executable instructions and programs for performing the processes described herein.

Server 102 further includes processor 106, such as an INTEL or AMD processor as known in the art. Processor 106 may receive the instructions from storage medium 104 and execute the instructions to process the electronic documents. Processor 106 may also receive the user inputs and process the electronic documents according to the user inputs. Processor 106 may further provide outputs to the user including processing results.

Server 102 may be connected to an external storage system 103 through communication link 105. Storage system 103 may include, for example, hard drive, CD ROM, DVD ROM, flash drive, or other storage media known in the art. Storage system 103 may provide extended storage capabilities for storing the electronic documents to be processed or data relevant to the processing of the electronic documents. Communication link 105 may be a wired connection, such as a USB connection, a serial connection, etc., or a wireless connection, such as a Wi-Fi link, a Bluetooth link, etc. Alternatively, storage system 103 may include a plurality of storage devices distributed remotely from server 102 at different geographical locations and connected to server 102 through computer networks, such as the Internet or other networks known in the art.

Server 102 may be further configured to communicate with other computers through computer network 116. Server 102 may include a network interface 107 for transmitting and receiving data through computer network 116. Network interface 107 may provide wired or wireless communications between computer network 116 and server 102. Computer network 116 may include one or more of Internet, Ethernet, ATM network, local area network (LAN), or wide area network (WAN), or other networks known in the art. Computer network 116 may communicate with server 102 based on standard protocols, such as TCP/IP, HTTP, FTP, etc.

According to one embodiment, server 102 may communicate with computer systems associated with entity 113, which may be a business or non-business entity. Entity 113 may be company, partnership, not-for-profit organization, government agency, educational institute, or any other entity. Entity 113 may include a plurality of computer systems 108 and 110 used or authorized to be used during the court of business of entity 113. For example, computer system 108 may be a data server or a mail server, such as a Microsoft Exchange Server, for storing emails of all personnel associated with entity 113 or data generated during the course of business of entity 113. As another example, computer system 110 may be desktop, laptop, pad or tablet, or smartphone authorized by entity 110 to be used by a person 112 associated entity 110. Person 112 may be an employee of entity 113, a contractor associated with entity 113, or any other personnel related to the activities of entity 113.

According to a further embodiment, entity 113 may be involved in a litigation case and subject to a discovery proceeding. For example, entity 113 may be required by a court or requested by an opposing party pursuant to rules or regulations to provide electronic documents relevant to a case. According to the rules and regulations governing the discovery proceeding, entity 113 may be required to identify and/or disclose custodians relevant to the litigation case, such as person 112 associated with entity 113, and electronic documents possessed by the custodians that are relevant to the litigation case. In addition, entity 113 may desire to review and identify privileged information, confidential information, or attorney work products that may be protected from disclosure in the discovery proceedings. The amount of electronic documents that need to be processed may be substantial and may be in a scale of gigabyte (GB) or terabyte (TB).

Server 102 may collect and receive the electronic documents from entity 113 for the identified custodians. Server 102 may receive the electronic documents from entity 113 through computer network 116 or other means. For example, a storage medium associated with computer system 108 or 110 may be physically transported and connected to server 102 for transmitting the electronic documents to server 102. Alternatively, a disc clone or image of the storage medium associated with computer system 108 or 110 may be created and transmitted to server 102. Still alternatively, server 102 may receive the electronic documents from third party systems, such as computer systems associated with GOOGLE or HOTMAIL, a backup system operated by a backup service provider, or other systems known in the art. Server 102 may store the electronic documents in storage medium 104 or external storage system 103.

When received from entity 113, the electronic documents may be stored in a format configured to preserve the integrity and authenticity of the information therein. For example, the electronic documents may be stored in one or more file containers designed to storage evidentiary information including raw files and folders, such as disc image files or other formats know in the art, which preserve not only the contents of the electronic documents but also other forensic information about the electronic documents. The file containers may preserve the hierarchy of the folders and the structure of the file system, in which the electronic documents are created. The file containers may be further encrypted and time stamped. Thus, the electronic documents stored therein may not be tempered with or modified. The file containers including the electronic documents may be stored in a data section of storage medium 104 or external storage system 103.

Server 102 may further process the electronic documents received from entity 113 according to the instructions stored in storage medium 104. According to one embodiment, server 102 may apply a computer forensics processing technique to the electronic documents. More particularly, server 102 may discover forensic information about the electronic documents by examining digital media or the file containers storing the electronic documents in a forensically sound manner to identify, extract, preserve, recover, analyze, and present facts about the electronic documents.

In addition, server 102 may process the electronic documents according to user inputs. For example, server 102 may receive the user inputs from a user 120 for processing the electronic documents. User 120 may be associated with entity 113, such as an in-house legal staff or an outside attorney recruited to represent entity 113 in the litigation case.

User 120 may interact with server 102 through computing device 118, which may be laptop, desktop, pad or tablet, or smartphone, as known in the art. Server 102 may provide computer-executable instructions, such as HTTP, XML, or other codes known in the art, to computing device 118. The computer-executable instructions may cause computing device 118 to render a web-based interface in a web browser, through which user 120 may interact with server 102. Alternatively, computing device 118 may download and install an application program from server 102 or third party system. When executed by computing device 118, application program may provide user interface similar to the web-based interface and allow user 120 to interact with server 102.

According to a further embodiment, server 102 may provide task management functionalities for the processing of the electronic documents. For example, server 102 may allow a sales person 124 to set up and manage client accounts. Server 102 may provide a user interface similar to those described above to sales person 124 through computing device 122 operated by sales person 124. Sales person 124 may set up client account for entity 113 and create a task list including one or more tasks for the processing of the electronic documents. Thereafter, server 102 may also allow user 120 to access and modify the client account or the task list set up by sales person 124. Alternatively, server 102 may allow user 120 to create the client account and the task list and allow sales person 124 to access and modify the client account and the task list.

Additionally, server 102 may assign the tasks in the task list to one or more persons, such as working attorneys or staffs, responsible for the discovery process. Server 102 may then allow user 120 or sales person 124 to monitor the progress or performance of each person and the associated costs of the processing of the electronic documents.

Server 102 may also allow user 120 to negotiate a service agreement with sales person 124 with respect to the processing of the electronic documents and execute the service agreement. Sales person 124 may draft the service agreement using the user interface generated on computing device 122 and store the service agreement to server 102. User 120 may access and view the service agreement through computing device 118 and modify the service agreement if necessary.

Still additionally, server 102 may facilitate an internal approval of the server agreement by an agreement management person 128. Agreement management person 128 may access and review the service agreement stored on server 102 through a similar user interface generated on a computing device 126 operated by agreement management person 128. Agreement management person 128 may modify and approve the service agreement before user 120 executes the service agreement.

Server 102 may provide notifications to user 120, sales person 124, and agreement management person 128 regarding various status of the electronic documents and events associated with the processing of the electronic documents. For example, server 102 may send emails or text messages to user 120, sales person 124, or agreement management person 128 regarding the status of the service agreement, the status of the electronic documents, or other processing results.

Server 102 may further provide billing functions for billing entity 113 or user 120 in connection with the processing of the electronic documents. For example, server 102 may generate bills based on the size or the number of the electronic documents that have been processed. The bills may specify total charges and unit prices for various tasks of processing the electronic documents. A billing person 132 may review and approve the bills through a computing device 130 operated by billing person 132. Server 102 may then transmit the bills to entity 113 or user 120 through, for example, email, mail, or fax. Sales person 124, agreement management person 128, and billing person 132 may be the same or different persons associated with the operation of server 102. For example, sales person 124, agreement management person 128, and billing person 132 may be employees of a business owning or operating server 102.

According to a still further embodiment, server 102 may communicate with a production unit 114 through computer network 116. Server 102 may transmit the processing results to the production unit 114 for document production according to requirements of discovery rules and regulations. For example, production unit 114 may print the processing results and provide the resulting documents to a party requesting the discovery. Alternatively, production unit 114 may store the processing results in a storage medium, such as hard drive, flash drive, CD ROM, DVD ROM, and/or provide the storage medium to the party requesting the discovery.

Figure 2:
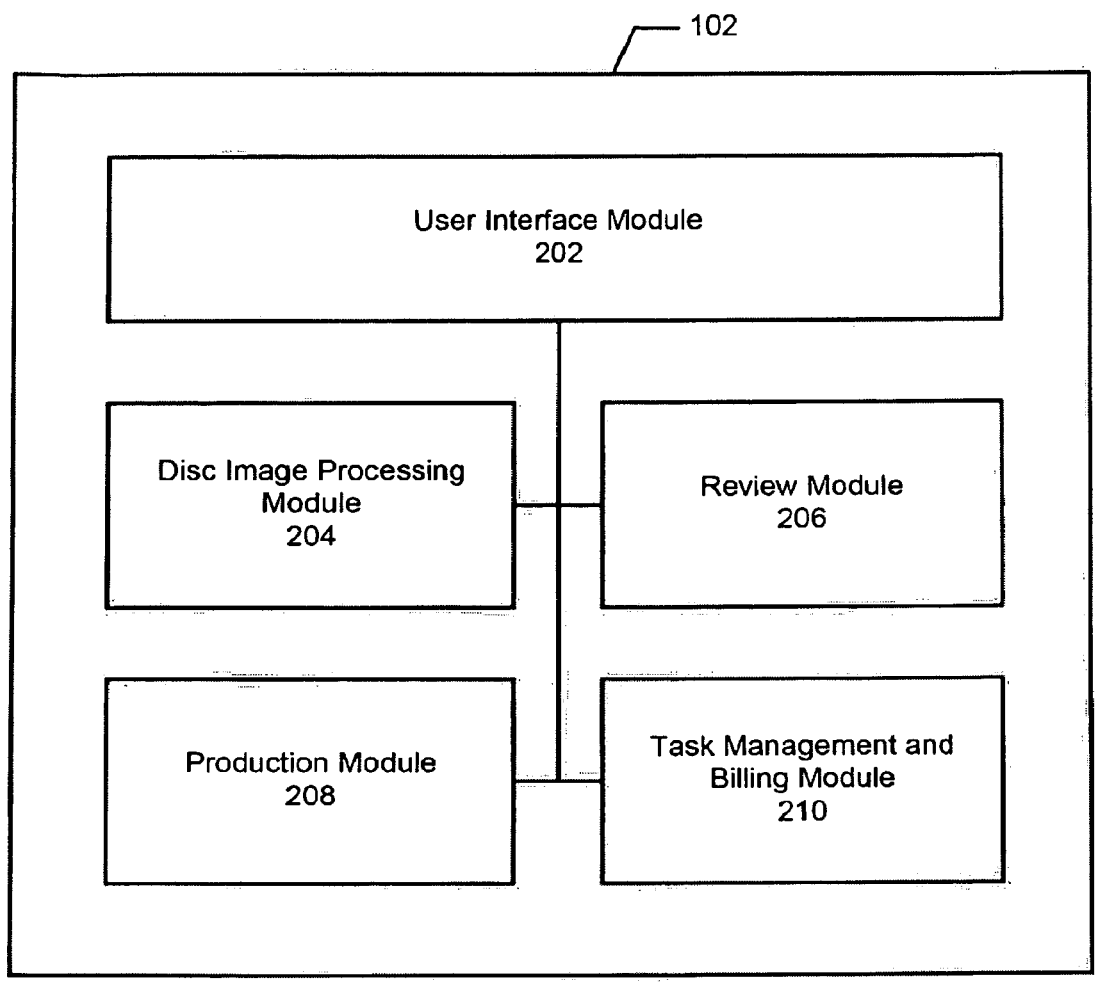
FIG. 2 is a block diagram of an exemplary embodiment of the server as depicted in FIG. 1 for processing the electronic documents.

FIG. 2 describes a further exemplary embodiment of server 102. The computer-executable instructions stored in storage medium 104 of server 102 may include a plurality of modules 202-210. Modules 202-210 may be implemented in one or more computer programs, which may be executed by processor 106 to perform the functionalities described herein associated with server 102.

More specifically, server 102 includes a user interface module 202 configured to provide graphical user interfaces, which may be generated by computing devices 118, 122, and 126. For example, user interface module 202 may transmit computer-executable codes, such as HTTP or XML codes, to computing devices 118, 122, 126, and 130. Upon receiving the computer-executable codes, computing device 118, 122, 126, or 130 may render a graphical user interface on a display device, such as a monitor or a touch screen. The user interface may include a plurality of graphic elements as known in the art, such as text boxes, check boxes, lists, menus, scroll bars, etc. The user interface may allow users, including user 120, sales person 124, agreement management person 128, or billing person 132, to interact with server 102 using user input devices, such as a mouse, a keyboard, or a touch pad. Server 102 may receive user inputs through the user interfaces generated on computing devices 118, 122, 126, and 130 and process the electronic documents according to the user inputs.

In addition, user interface module 202 may transmit data relevant to the processing of the electronic documents to computing devices 118, 122, 126, and 130. The data may indicate, for example, results, status, or errors generated from the processing of the electronic documents. For example, the data may indicate a filtering result after the electronic documents are filtered according to criteria specified by user 120. The data may also indicate a percentage of the electronic documents that have been processed. The data may also indicate statistical characteristics of the electronic documents after the processing by server 102. The data may also include user account information such as a user name, a task list associated with a user account, an agreement status with respect to a project, etc.

According to a still further embodiment, interface module 202 may provide different user interfaces to different types of users depending on their respective log-in credentials. For example, user interface module 202 may cause computing devices 118, 122, 126, or 130 to generate a log-in interface promoting a user to provide a log-in credential including a user name and password. After receiving the user credential, user interface module 202 may cause computing devices 118, 122, 126, and 130 to generate different user interfaces corresponding to the respective log-in credentials of user 120, sales person 124, and agreement management person 126.

Server 102 may further include a disc image processing module 204 for processing the electronic documents collected from entity 113. According to one embodiment, disc image processing module 204 may scan and index the electronic documents stored within the file containers as described above. More specifically, disc image processing module 204 may scan and index the electronic documents without retrieving the contents of the electronic documents. For example, disc image processing module 204 may extract metadata from the file container without extracting the contents of the electronic documents. The metadata may include, for example, forensic information about the electronic documents, such as information of the file system associated with the electronic documents, the structure or layout of the folders within the file system, the number of electronic documents stored within the folders, the types and names of the documents, the modification history of each document, the custodians of the electronic documents, information of documents that have been deleted, and any other information relevant to a forensic analysis of the electronic documents.

Disc image processing module 204 may be configured to scan the electronic documents created and stored in a variety of file systems, such as DOS partitions, BSD partitions, Mac partitions, Sun slices, GPT disks, or any other types of file systems known in the art. Disc image processing module 204 may identify where the electronic documents are located in the file container and extract the corresponding metadata for forensic analysis.

Additionally, disc image processing module 204 may create a list of all electronic documents, a list of all folders storing the electronic documents, and a list of electronic documents within each folder based on the retrieved metadata. Disc image processing module 204 may create the lists without actually retrieving any contents from the electronic documents themselves. The lists may include the forensic information retrieved from the metadata as discussed above. The forensic information may also specify structural relationships of the folders storing the electronic data. The structural relationship may correspond to the specific file system, in which the electronic documents were created.

According to a further embodiment, disc image processing module 204 may further catalog the electronic documents based on the retrieved metadata. During the cataloging, disc image processing module 204 may calculate various statistical characteristics of the electronic documents. For example, disc image processing module 204 may calculate a total number of the electronic documents and sizes of the electronic documents stored in the file container. Disc image processing module 204 may also calculate a total number of different document types in the electronic documents. The documents types may include, for example, system file, executable file. PDF file, WORD file, POWERPOINT file, JPG file. Disc image processing module 204 may determine the documents types based on file extensions of the electronic documents as indicated in the metadata. Disc image processing module 204 may also calculate a total number of electronic documents that belong to each document type and a percentage of the electronic documents belonging to that type.

Alternatively, disc image processing module 204 may also calculate the total number of custodians in the electronic documents and the number of electronic documents associated with each custodians. Disc image processing module 204 may calculate the number of email files in the electronic documents and the number of attachment files associated with the email files. Disc image processing module 204 may calculate the number of original files and the number of duplicated files among the electronic documents. Disc image processing module 204 may also calculate the number of domain names, such as AOL.COM, GOOGLE.COM, or HOTMAIL.COM, associated with the electronic documents and the number of files associated with each domain names. An electronic document is associated with a domain name when, for example, the metadata of the electronic document includes an identification of the domain name.

According to a further embodiment, disc image processing module 204 may automatically filter the electronic documents based on the retrieved metadata. For example, disc image processing module 204 may automatically filter out certain document types, such as the system file or the executable file, which are irrelevant or undesired for the discovery process. Disc image processing module 204 may remove the undesired file types from the lists created based on the metadata.

Figure 6A:
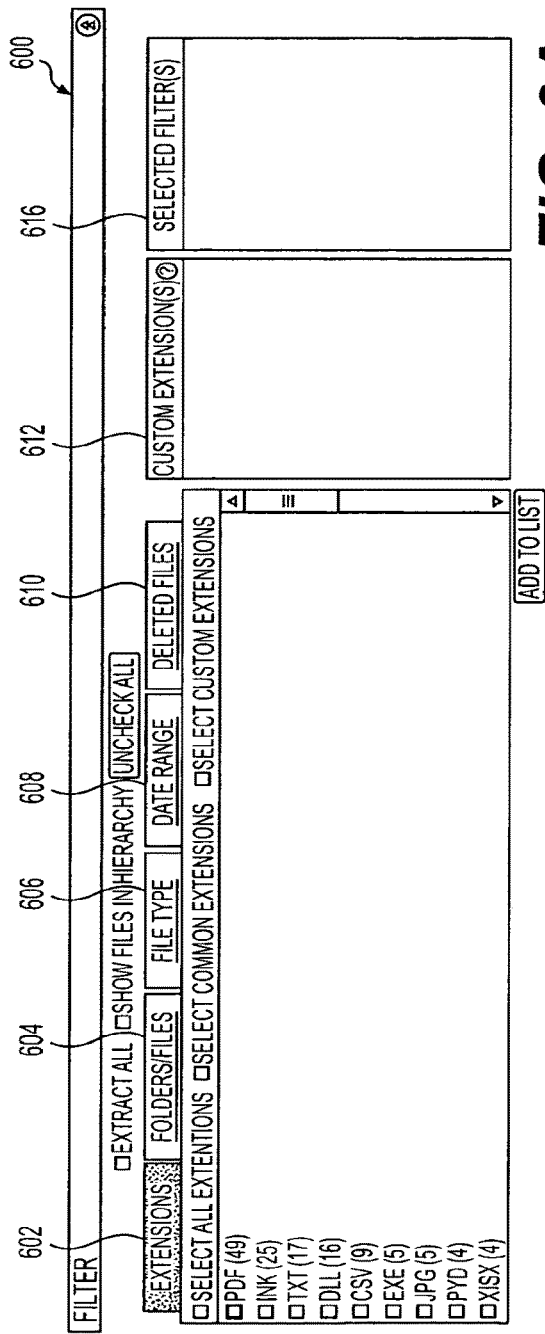
FIGS. 6A-6C are exemplary user interfaces for the interactive filtering in connection with processing of the electronic documents.
Figure 6B:
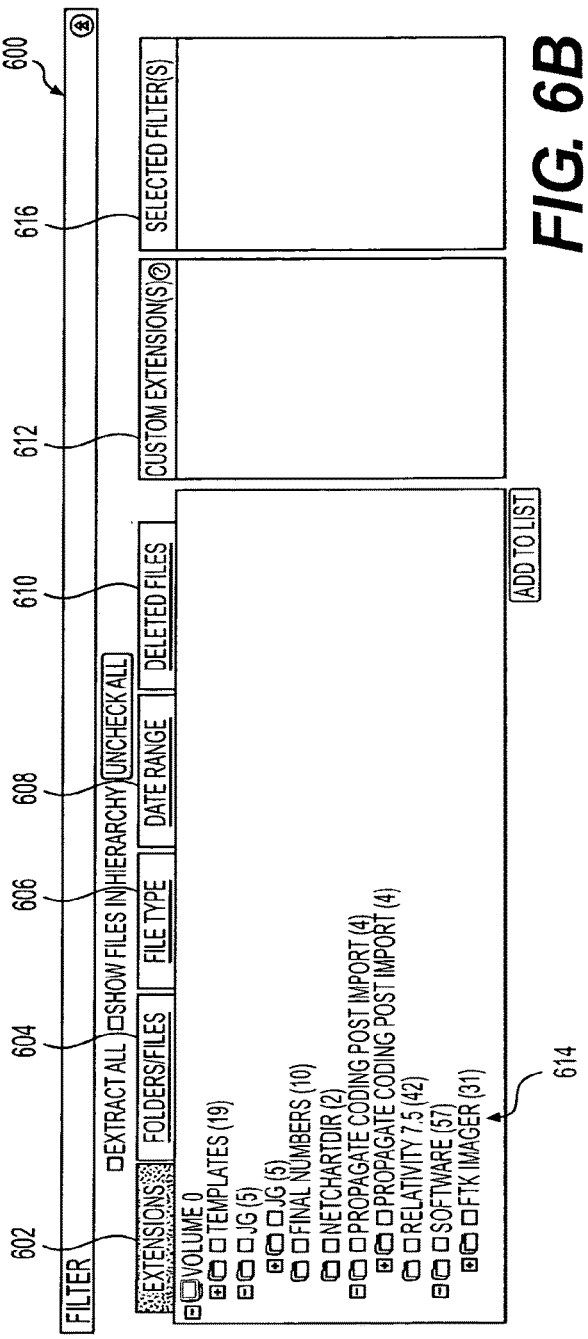
Figure 6C:
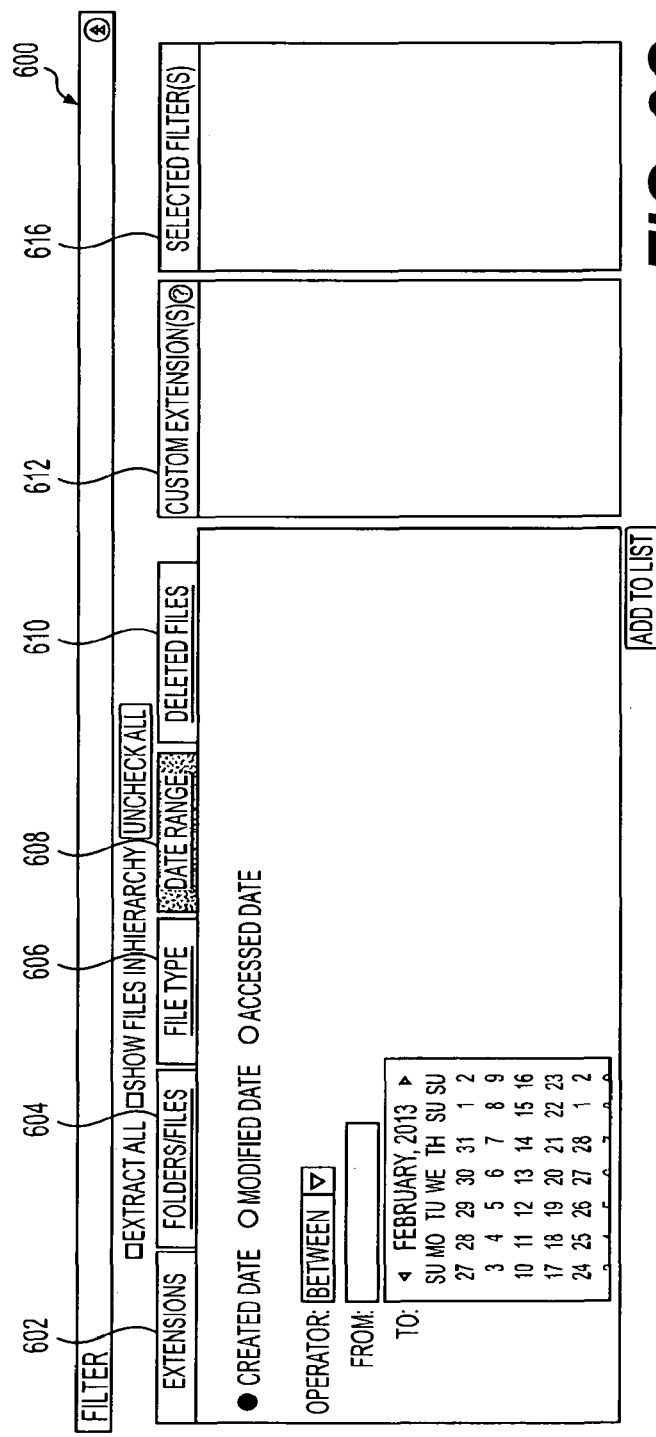

According to a still further embodiment, disc image processing module 204 may receive user inputs through user interface module 202 and apply interactive filtering according to the user inputs. FIGS. 6A-6C show a user interface 600 generated by user interface module 202 for disc image processing module 204 to perform the interactive filtering. User interface 600 may be generated on computing device 118. User 120 may provide the user inputs through user interface 600 and cause disc image processing module 204 to filter the electronic documents according to different aspects of the forensic information.

More particularly, user interface 600 may include a plurality of tabs 602-612, each corresponding to an aspect of the forensic information of the electronic documents. User 120 may provide the user inputs by selecting one or more of tabs 602-612. The user inputs may include, for example, a document name, a document type, a folder name, a custodian name, a file extension, a domain name, a date range, a time range, or a keyword. The user inputs may be listed in a Selected Filter field 616, as shown in FIGS. 6A-6C.

For example, when user 120 selects Extensions tab 602 and one or more file extensions listed therein as shown in FIG. 6A, disc image processing module 204 may filter the electronic documents according to one or more file extensions, as requested by user 120. Disc image processing module 204 may generate a filtering result including only the metadata of resulting electronic documents having the identified file extensions. If a desired file extension is not listed in Extensions tab 602, user interface 600 allow user 120 to input custom file extensions through a Custom Extension field 612.

Alternatively, when user 120 selects Folders/files tab 604 as shown in FIG. 6B, a folder structure 614 is shown in user interface 600. User 120 may then further select individual folders from folder structure 614. Accordingly, disc image processing module 204 may generate a filtering result including only the metadata of the electronic documents stored in the selected folders. Alternatively, the user inputs may also identify a specific folder name. Disc image processing module 204 may generate a filtering result including only the metadata of the electronic documents in the file folders having the identified folder name.

Still alternatively, user 120 may select Date Range tab 608 and identify a date range as shown in FIG. 6C. Disc image processing module 204 may generate a filtering result including only the metadata of the electronic documents created or last modified within the date and time range.

As a further alternative, user 120 may identify that deleted contents are desired by selecting Deleted Files tab 610. Accordingly, disc image processing module 204 may generate a filtering result including only the metadata of the electronic documents that have been identified as being deleted.

Still alternatively, disc image processing module 204 may conduct a filtering based on a keyword provided by user 120. User 120 may provide a keyword, such as a business name, a name of a custodian, a product name, or any other keyword that user 120 determines to be relevant to the discovery process. Disc image processing module 204 may receive the keyword through user interface module 202 and determine the electronic documents that match the keyword. Disc image processing module 204 may determine the matching based on the metadata of the electronic documents without searching for the keyword in the contents of the electronic documents. Additionally, disc image processing module 204 may further catalog the filtering results based on document type, date range, custodian, or other characteristics of the resulting electronic documents.

Disc image processing module 204 may perform any other filtering operations that are desired by user 120 in the interactive filtering process. Disc image processing module 204 may perform these filtering operations relying on the metadata retrieved from the file containers storing the electronic documents without extracting the contents of the electronic documents.

Figure 7A:
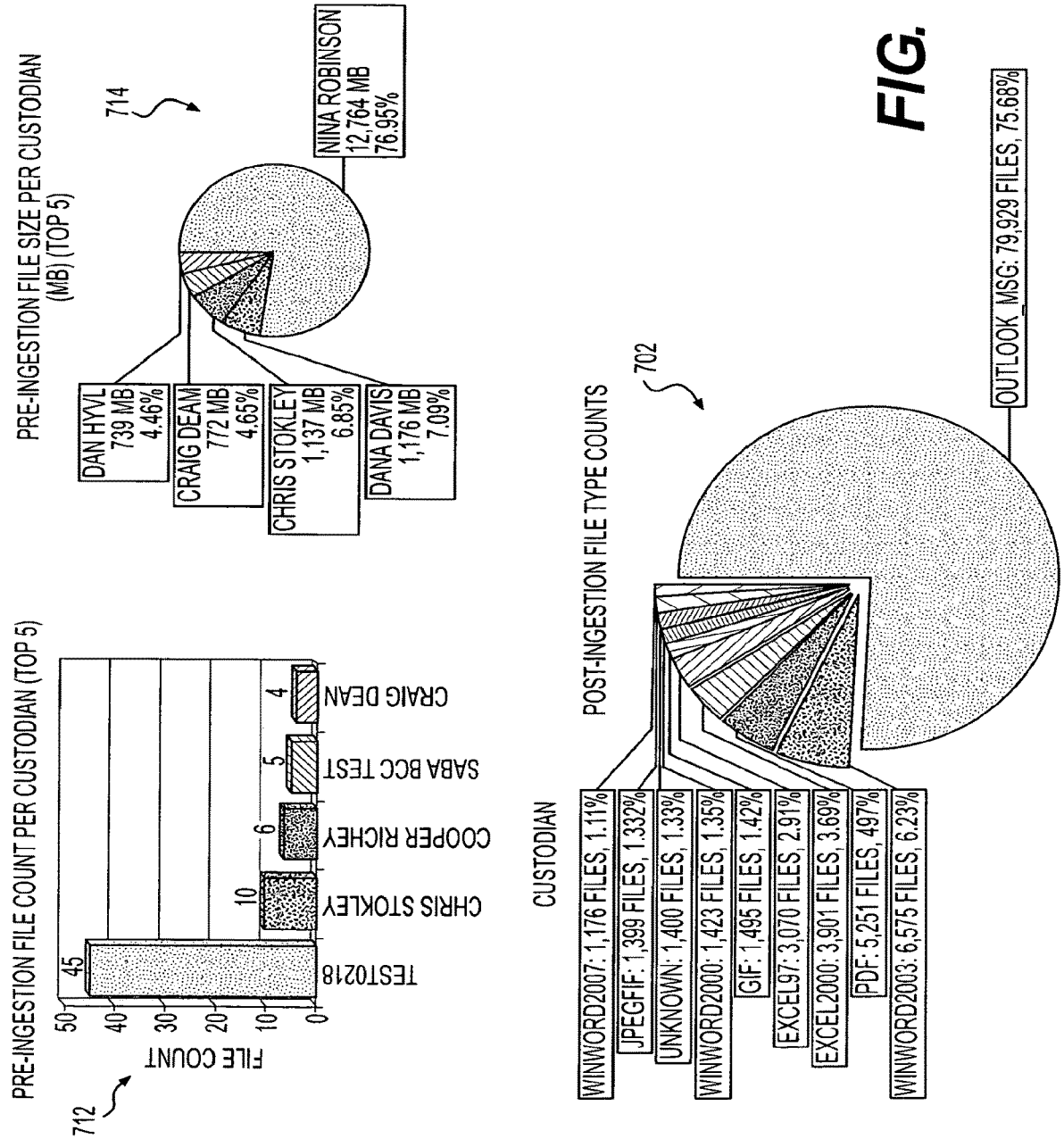
FIGS. 7A-7C are exemplary graphical representations of the filtering results.
Figure 7B:
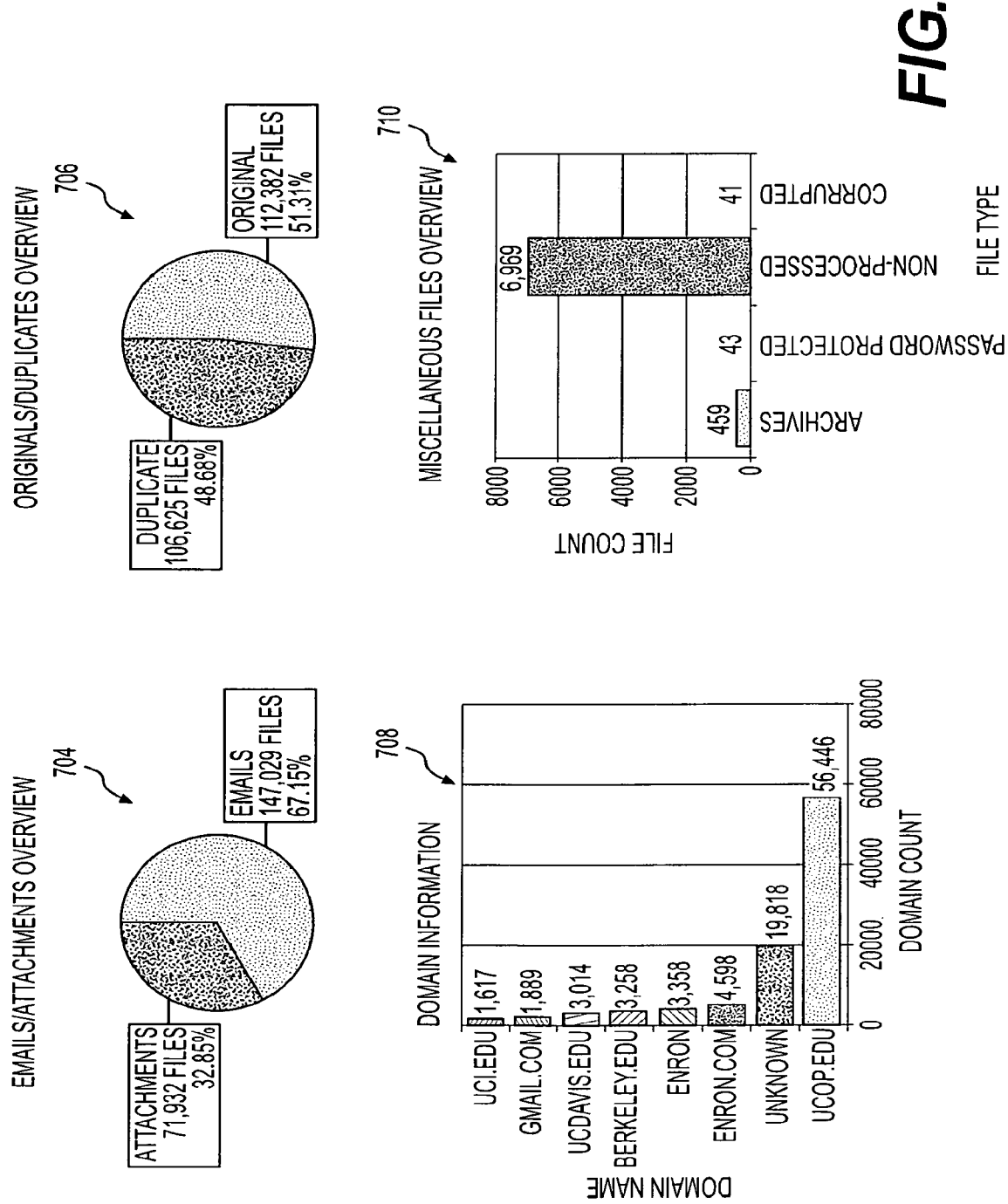

According to a still further embodiment, disc image processing module 204 may report the filtering results to user 120 through user interface module 202. For example, the disc image processing module 204 may transmit the filtering results to user interface module 202, which transmits data indicative of the filtering results to computing device 118. User interface module 202 may cause computing device 118 to generate a graphical representation of the filtering results. FIGS. 7A-7B depicts exemplary embodiments of the graphical representation for reporting the filtering results. The graphical representation may include one or more pie charts 702, 704, and 706, each having a plurality of portions. Each of the portions may correspond to, for example, a document type, a file extension, a custodian, a folder, a domain name, etc. The graphical representation may also include one or more bar graphs 708 and 710 having a plurality of bars, each presenting a characteristic of the electronic documents as discussed above. Other graphical elements as known in the art may also be used by user interface module 202 to present the filtering results to user 120.

According to a further embodiment, disc image processing module 204 may generate the filtering results in substantially real time upon receiving the user inputs from user 120. Thus, the graphical representation based on the filtering results provides user 120 with a real-time visualization of various aspects of the electronic documents as the filtering process is carried out. The graphical representation may facilitate user 120 to determine and discover relevant electronic documents for the litigation case without the burden of reviewing the actual contents of the electronic documents. For example, if email correspondences regarding a particular topic are relevant to the litigation case, the graphical representation may allow user 120 to quickly determine whether the electronic documents collected from entity 113 include emails regarding the topic. As another example, if electronic documents of a particular type created by a given custodian are desired, the graphical representation may also allow user 120 to quickly determine whether the electronic documents collected from entity 113 include the electronic documents of the particular type and created by the custodian.

According to a further embodiment, disc image processing module 204 may allow user 120 to adjust the filtering criteria interactively to fine tune the filtering operation. Disc image processing module 204 may receive additional filtering criteria from user 120 to further limit or modify the filtering results. User 120 may provide, for example, a document type, a keyword, or a date range as an additional criterion. Upon receiving the additional criterion from user 120, disc image processing module 204 may then further filter the filtering results based on the additional criterion. Again, disc image processing module 204 may perform the interactive filtering in substantially real time without extracting the contents of the electronic documents.

Additionally, disc image processing module 204 may further report the lists of electronic documents (i.e., the pre-filtering lists), including the forensic information extracted from the file container, generated before the filtering operations to user 120 for comparison. Disc image processing module 204 may transmit, through user interface module 202, the pre-filtering lists to computing device 118 and cause computer device 118 to render a graphical representation of the pre-filtering lists similar to those described above. For example, FIG. 7A depicts an exemplary bar graph 712 showing numbers of documents possessed by different custodians based on the forensic information before the filtering. FIG. 7A further depicts an exemplary pie chart 714 showing compositions of the electronic documents before the filtering as possessed by different custodians.

Figure 7C:
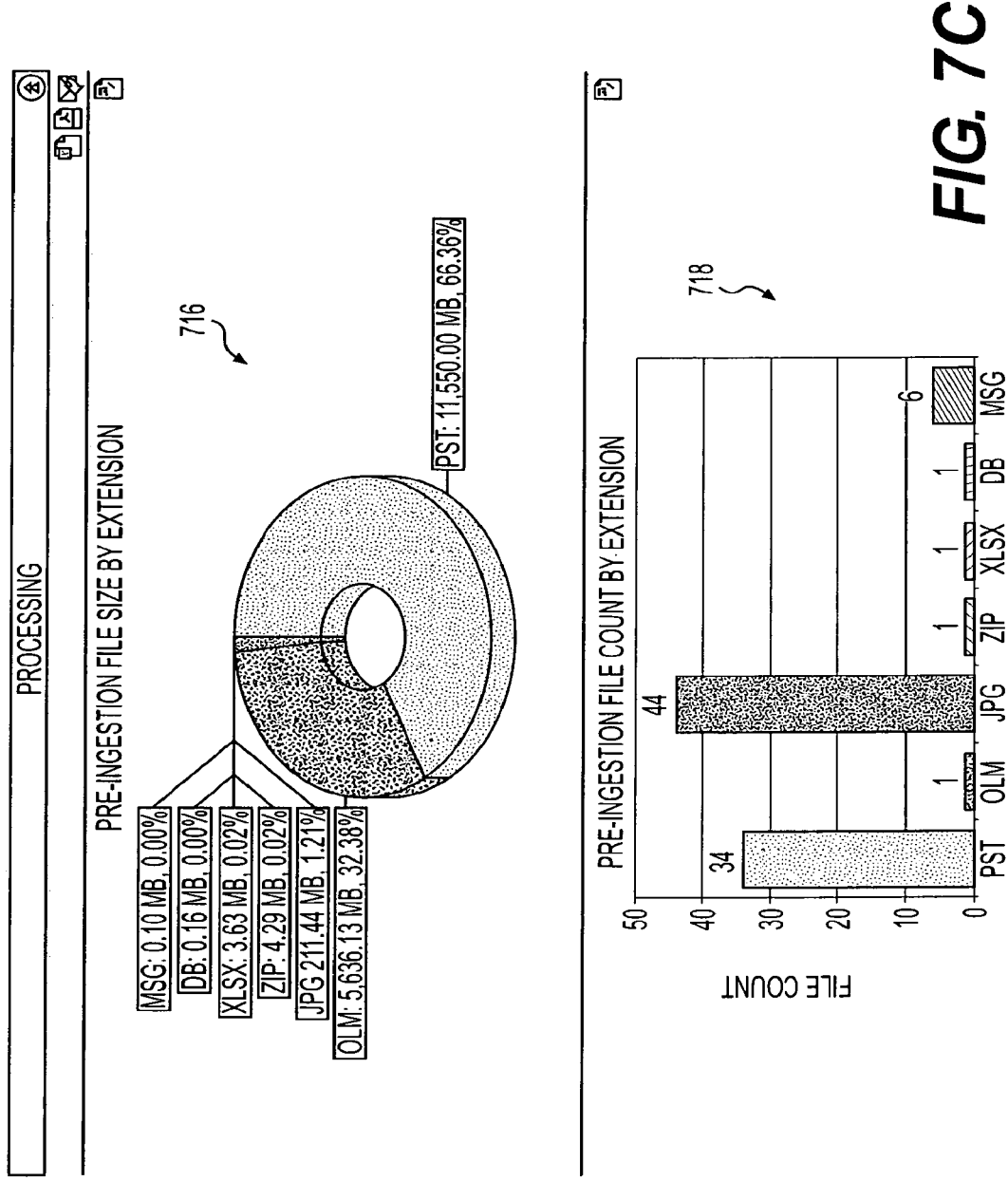

FIG. 7C further depicts an exemplary pie chart 716 and bar graph 718 showing forensic information on the file extensions in the list of the electronic documents before the filtering. The graphical representation may also include other graphical elements presenting other aspects of the forensic information before the filtering.

Still additionally, disc image processing module 204 may transmit the structure of the file system associated with the electronic documents to computing device 118. Computing device 118 may then render a graphical representation of the structure including, for example, a plurality of folders and their hierarchical relationships. The resulting electronic documents generated from the filtering operation may be displayed in the respective folders as they were originally stored when collected from entity 113. Thus, disc image processing module 204 may provide user 120 with not only the filtering results including the individual documents generated by the filtering operation but also a graphical representation of the structure of the file system after the filtering.

The interactive filtering may be conducted for multiple rounds at the request of user 120. If not satisfied with the filtering results after adjusting the filtering results, user 120 may instruct server 102 to collect additional electronic documents from entity 113. Server 102 may receive and process the additional electronic documents similarly as described herein. Server 102 may continue to collect additional electronic documents until user 120 is satisfied with the filtering results.

When satisfied with the filtering results, user 120 may provide a user input through the user interface to store the filtering results including a set of the electronic documents collected from entities 113. Upon receiving the user input, disc image processing module 204 may store the filtering results into a queue waiting to be further processed. The queue may be a portion of storage medium 104 or external storage system 103. The queue may include all of the filtering results produced by user 120 and other users of system 100.

The filtering results saved in the queue may be further processed in sequence. More specifically, disc image processing module 204 may further provide a file count and sizes of the extracted electronic documents. Disc image processing module 204 may present information about the file count and the sizes to user 120 through user interface module 202. The information may be used by server 102 as a basis for a cost estimate associated with the subsequent processing of the electronic documents, such as extraction of the electronic documents from the file containers, review of the contents of the electronic documents, and production of the electronic documents to be submitted to the discovery process.

According to a further embodiment, disc image processing module 204 may receive a user input from user 120 for selectively extracting the electronic documents identified in the filtering results and their contents from the file containers. Disc image processing module 204 may create a copy of the extracted data and store the copy in storage medium 104 or external storage system 103. When storing the extracted data, disc image processing module 204 may retain the structure of the file system, in which the electronic documents were created. The sizes of the extracted data and the number of electronic documents in the extracted data may be significantly smaller than those of the electronic documents originally collected from entity 113.

Figure 9:
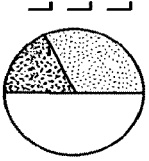
FIG. 9 is an exemplary user interface for reviewing the electronic documents.

According to a further embodiment, server 102 may include a review module 206 configured to allow user 120 to review the contents of the extracted electronic documents. Review module 206 may convert the extracted electronic documents into formats, such as PDF, WORD, TIFF, etc., which facilitate the review by user 120. Review module 206 may allow user 120 to access the extracted electronic documents through user interface module 202. According to one embodiment as shown in FIG. 9, review module 206 may present the extracted electronic documents to user through a user interface 900 generated on computing device 118 and allow user 120 to further review and screen the electronic documents through user interface 900. User interface 900 generated according to review module 206 may include a plurality of fields or elements.

For example, user interface 900 may include a document view pane for user 120 to view and inspect the contents of the resulting electronic documents. User interface 900 may include document metadata field showing the information about the electronic document being inspected. User interface 900 may include a coding and tagging field showing, for example, color codes and tags used to mark up the contents of the electronic document. User interface 900 may include a file and view sharing field, showing all of the users who are sharing a particular documents at the same time. User interface 900 may also include a reviewer chat field that allows user 120 to interact with other users through text messages, video conference, or other interactive means. User interface 900 may also include an activity feed field showing activities of all of the users inspecting the electronic documents. User interface 900 may include a time related statistics field showing times spent by user 120 on various activities associated with the inspection of the electronic documents. User interface 900 may also include a cost related statistics field showing various costs associated with the inspection of the electronic documents.

Review module 206 may receive user inputs from user 120 indicating whether the extracted electronic documents are relevant or irrelevant to the current legal proceeding. If a document is indicated as irrelevant, review module 206 may remove the document or place it in an irrelevant document list. Review module 206 may also receive user inputs from user 120 indicating whether the extracted electronic documents are confidential information, privileged information, or attorney work product, which protect the document from being disclosed in the discovery proceeding. If a document is indicated as confidential information, privileged information, or attorney work product, review module 206 may place the document in a respective list.

The extracted documents may be reviewed by a plurality of users to ensure that they are correctly marked and designated. Review module 206 may generate a production list including all of the documents that are identified as relevant, non-confidential, non-privileged, and non-attorney work product and store the production list in storage medium 104 or external storage system 103.

Server 102 may further include a production module 208. Production module 208 may retrieve the production list including all of the properly extracted and identified electronic documents subject to the discovery process. Production module 208 may prepare the production by transmitting the identified electronic documents to a production unit 114, which may produce the documents as described above. Alternatively, production module 208 may store the identified electronic documents to a storage medium, such as CD, DVD, flash drive, or hard drive.

Server 103 may further include a task management and billing module 210. Task management and billing module 210 may allow users of server 102, including user 120, sales person 124, agreement management person 128, and billing person 132 to manage the processing of the electronic documents. For example, task management and billing module 210 may include a plurality of user accounts, each associated with user 120, sales person 124, agreement management person 128, or billing person 132. Task management and billing module 210 may receive inputs from the users to set up, modify, or remove a user account.

Through the user interfaces generated on the computing devices in communication with server 102, task management and billing module 210 may allow a user to define a scope of an initial collection for the discovery process. The scope of the initial collection may cover all or part of electronic documents possessed by entity 113. The user may define the scope of the initial collection based on custodians of the electronic documents, who may be individual employees of entity 113. The user may also define the scope of the initial collection based on individual storage media, which may be the hard drives on individual computers or the shared storage medium on server 108 associated with entity 113.

Task management and billing module 210 may also allow the user to monitor the status and specifications of the processing of the electronic documents. Task management and billing module 210 may display information through a user interface about the status and specifications of individual tasks or individual projects in connection with the processing of the electronic documents.

Figure 8:
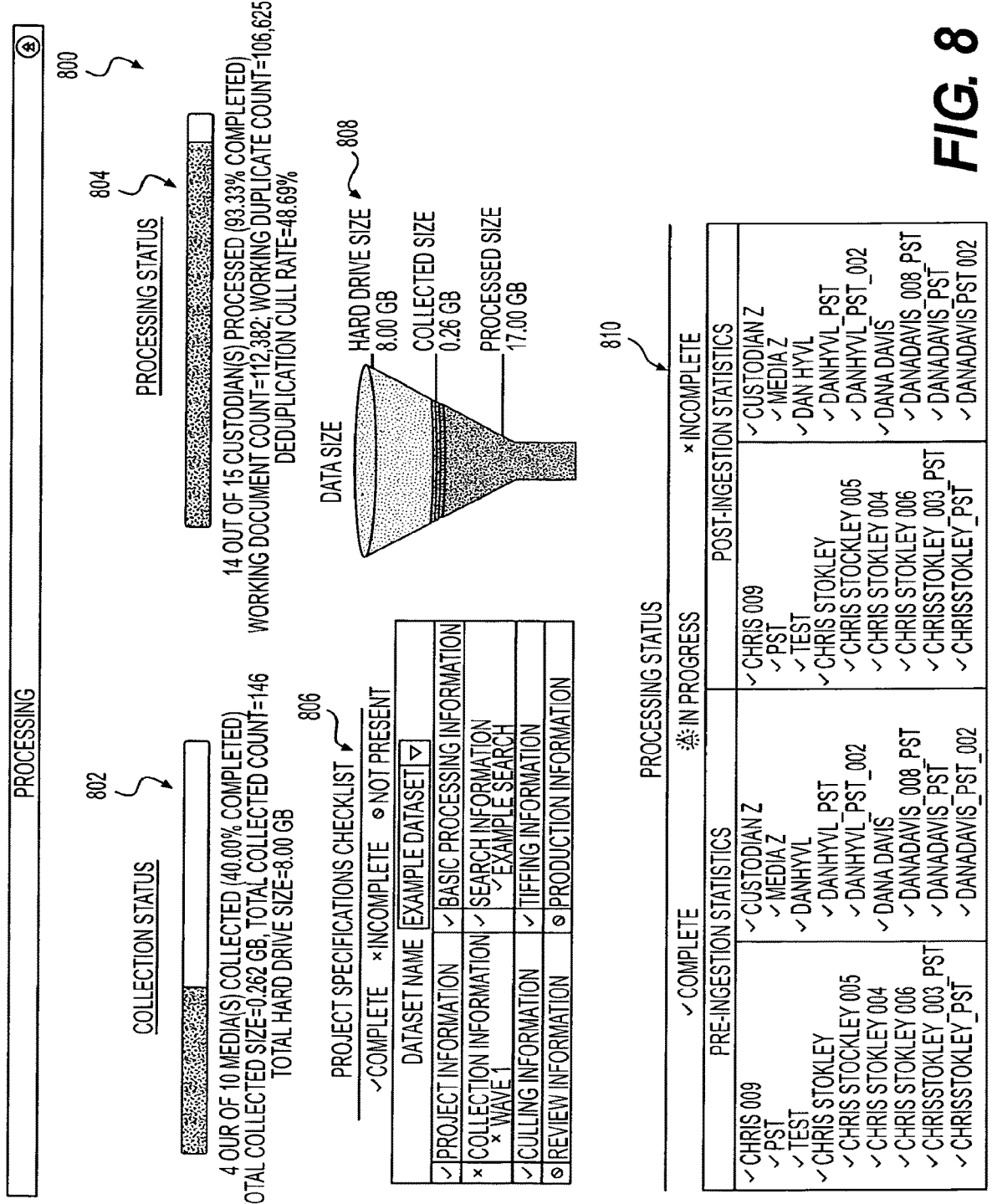
FIG. 8 is an exemplary user interface for reporting status and specifications of a project in connection with processing of the electronic documents.

FIG. 8 depicts an exemplary user interface 800 for presenting the status and specification information. For example, user interface 800 may include a status bar 802 indicating a progress of a collection project from entity 113. Status bar 802 may provide a visual indication as to a percentage of all of the electronic documents that have been collected from entity 113. User interface 800 may also include a status bar 804 indicating a progress of an individual processing task that is being carried out. User interface 800 may also include a list 806 showing the specifications of the collection project. List 806 may include information, such as, an identification of the file container being processed, whether the project information is complete, whether the interactive filtering criteria have been properly set, etc. Interface 800 may further include a graphical element 808 showing comparisons of the electronic documents at different processing stages. For example, graphical element 808 may include a funnel shape with numerical values indicating a size of the electronic documents before collection, a size of the electronic documents after collection, and a size of the electronic documents after processing. Graphical element 808 may provide a visual indication as to the amount of the electronic documents that are being retained and filtered out during the processing of the electronic document. Interface 800 may further include a list 810 showing status of the electronic documents collected from different custodians. List 810 may further include indicators indicating whether the electronic documents associated with individual custodians have been successfully processed. Other graphical elements may be included in interface 800 to show additional status of the project and the electronic documents.

Task management and billing module 210 may also notify the user when a processing task or project is completed or when a bill is ready. Task management and billing module 210 may present the bill to the user and receive payments from the user.

Figure 3:
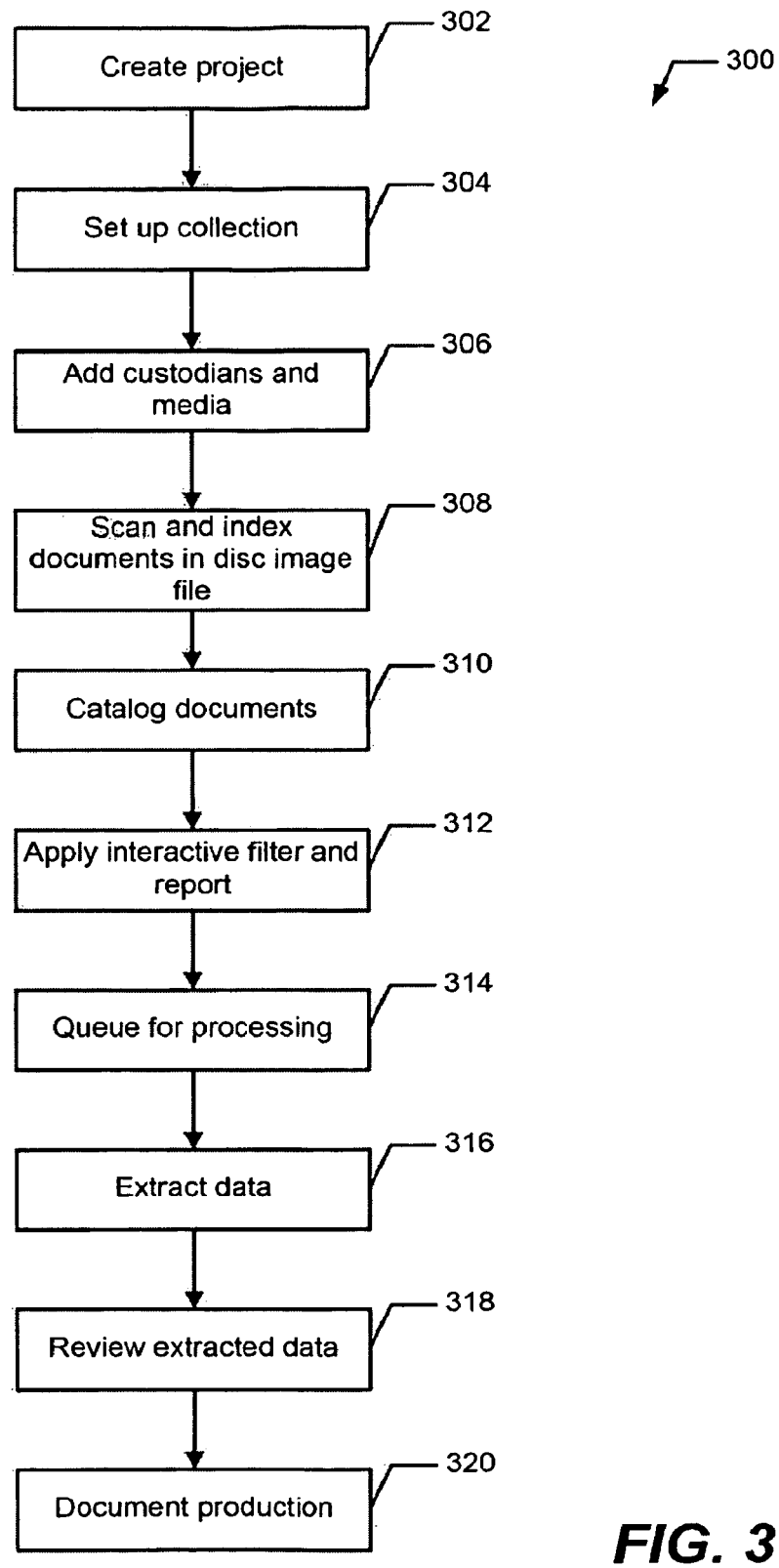
FIG. 3 is a flow chart of an exemplary process for processing the electronic documents.

FIG. 3 depicts a flow chart of a process 300 for processing electronic documents. Process 300 may be implemented on server 102 as depicted in FIG. 2. According to process 300, at step 302, a project is created for processing the electronic documents. The project may be created by task management and billing module 210 upon receiving user inputs from a user, such as user 120, sales person 124, agreement management person 128, or billing person 132. The user may log into a user account through the user interface rendered on a computing device operated by the user and provide a project name, a reference number associated with the project, a client name, a project location, and client contact information, etc. Task management and billing module 210 may record the date and time when the project is created and assign a status indicator to the project. The status indicator may have an Initial value indicating that the project is active, meaning that it is an ongoing project.

Task management and billing module 210 may further assign a manager to the project and associate the project with an identification of the manager. The manager may be user 120, sales person 124, agreement management person 128, or billing person 132, or other persons associated with entity 113.

Task management and billing module 210 may also assign permissions to each user for accessing the project. The permissions may be assigned based on inputs from the user who created the project, user account type, the entity to which the user is associated, and other information known in the art.

At step 304, a collection is set up for the project. Task management and billing module 210 may prompt the user to input information about the collection including, for example, identifications of the custodians of the electronic documents to be collected, a location of the collection, and storage media from which the electronic documents are to be collected. The user inputs may also indicate a range of date and time of the electronic documents subject to the collection.

At step 306, task management and billing module 210 may add the custodians and the storage media to the collection. Task management and billing module 210 may associated the collection with an identification number and use the identification of the collection to identify, for example, individual file containers including the electronic documents collected from entity 113. When the collected electronic documents are received, task management and billing module 210 may store the file containers including the collected electronic documents in storage medium 104 or external storage system 103 and associate the file containers with the identification number of the collection. In addition, task management and billing module 210 may generate a chain of custody for a given custodian and medium received from entity 113.

At step 308, electronic documents in each file container are scanned and indexed. The scanning and indexing may be performed by disc image processing module 204 as described above. Disc image processing module 204 may extract and scan all forensic information, such as the metadata, of the electronic documents from the file container and create a list of all electronic documents. Disc image processing module 204 may retrieve the forensic information from the file containers without extracting the electronic documents themselves.

At step 310, the electronic documents are cataloged. More specifically, disc image processing module 204 may catalog the electronic documents based on the forensic information retrieved from the file container as described above. Disc image processing module 204 may then present the cataloging results to a user through a user interface generated on a computing device, showing the quality, locations, and names of all the electronic documents contained in the file containers.

At step 312, an interactive filtering and reporting may be performed. More specifically, disc image processing module 204 may receive user inputs including filtering criteria and apply the filtering criteria to the list of all the electronic documents. Based on the filtering criteria, disc image processing module 204 may filter the electronic documents on different aspects including, for example, document type, file extension, folder location, date range, etc., as described above, in connection with FIGS. 6A-6C. Disc image processing 204 may present the filtering results to the user in substantially real time as shown in FIGS. 7A-7C and 8. Disc image processing may also receive additional user inputs for adjusting the filtering results and present adjusted filtering results in substantially real time.

At step 314, the filtering results are queued for further processing. More particular, disc image processing module 204 may place the filtering results from the filtering process in a queue as described above. In addition, disc image processing module 204 may determine the number of electronic documents and sizes of the electronic documents produced by the filtering process.

At step 316, contents of the electronic documents produced by the filtering process are extracted from the file containers. Disc image processing module 204 may selectively extract the electronic documents from the file containers and store them with their forensic information in storage medium 104 or external storage system 103. In storing the electronic documents, disc image processing module 204 may retain the structure and other forensic data of the file system in which the electronic documents were created.

At step 318, the extracted electronic documents are further reviewed. More particularly, review module 206 may convert the extract electronic documents to a format suitable for review by a user using a computing device and present the electronic documents to the user. Review module 206 may receive user inputs indicating whether the electronic documents are relevant, confidential, privileged, or attorney work product. Review module 206 may properly mark the electronic documents accordingly and identify the electronic documents suitable for subsequent production.

At step 320, the properly reviewed and identified electronic documents are produced for submission to discovery. More particularly, production module 208 may store the resulting electronic documents in a storage medium to be submitted to the discovery proceedings or transmit the document to a third party for production. Alternatively, production module 208 may share the resulting electronic documents with other parties, including the courts, the opposing parties and their counsels, and any third parties. Production module 208 may transmit the resulting electronic documents through, for example, network 116 to a shared database, which may be accessed by other parties. Production module 208 may also track a production with information including, for example, a numbering scheme, search or tag conditions for data to be produced, branding information, metadata fields required, volume naming, load files, delivery method, delivery media and labeling, etc. Production module 208 may further track statistics of the production including, for example, date ranges, native and image file counts, production sizes, number of copies, and shipping information.

Figure 3A:
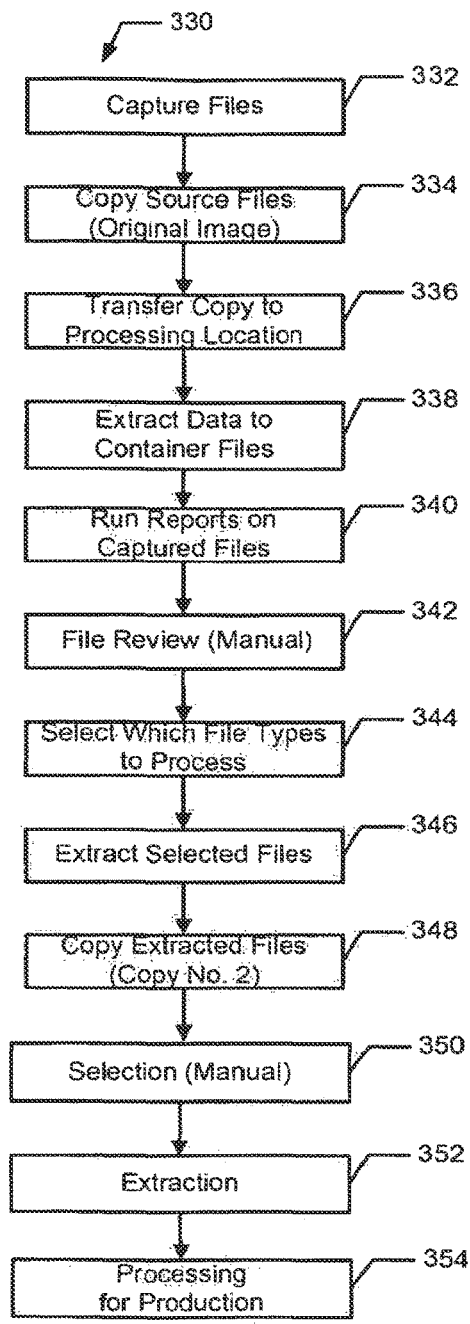
FIG. 3A is a flow chart of a prior known process for processing the electronic documents.
Figure 3B:
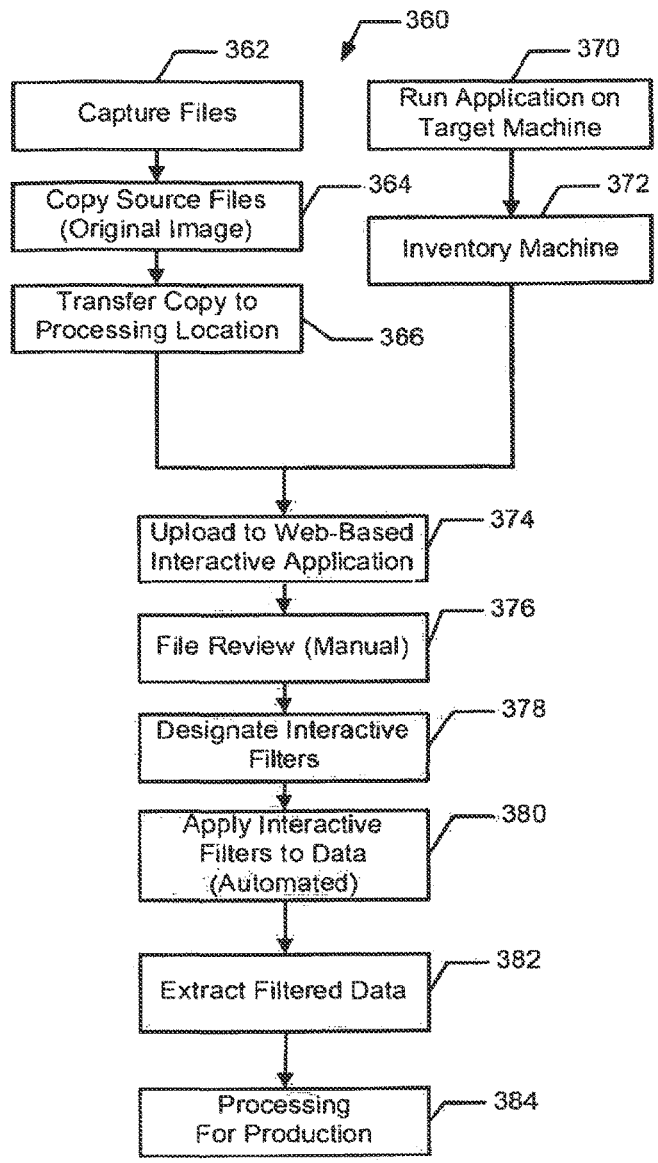
FIG. 3B is a flow chart of another exemplary process for processing the electronic documents.

FIG. 3A depicts a flowchart of a prior known process 330 for processing documents. FIG. 3B depicts a flowchart of a process according to an embodiment of the present disclosure. In the prior known process, depicted in FIG. 3A, files are first captured (332), typically physically by a vendor recruited for document processing and production. The vendor typically must physically go to a client's location and copy (or ghost) computer drives or other storage media to create (334) an original image file set including copies of the original documents maintained by the client. The original documents (e.g., the source files) are copied from their original locations to the original image file set. The original image file set is then transferred physically (336) to a processing location, at which further processing is conducted on the collection of the documents. The vendor typically extracts (338) the data of interest from the original image files and stores the extracted data to container files. These container files constitute a first copy of the original image files. These container files will then serve as the basis for further processing of the document collection.

In the prior known process, the vendor typically runs a report (340) on the captured files and provides a report to the client in the form of an Excel spreadsheet or other suitable medium detailing all of the files captured by name, size, file type, author, creation date, custodian, or other suitable criteria. This report is then reviewed (342) by the client or one of the members of the client's litigation team. This review typically occurs manually in the prior known process. Specifically, an attorney or paralegal would substantively review the report and identify files or groups of documents by criteria (344), such as file type (for example, documents, spreadsheets, emails, pdf files, etc.), date, author, or other appropriate criteria. This manual review identifies documents that are being selected for further processing. This information is then transferred back to the vendor with instructions about which files and file types have been selected for processing.

In the prior known process, the vendor would then extract the selected files (346) and prepare yet a second copy of the extracted files for further processing (348). These extracted files (i.e., the second copy) would then be provided to the client, either on disc or through a web-based application, for review and processing at the client's location, at another location, or over a web-based application. This provides the client's representatives an opportunity to review the contents of the documents substantively. This review in the prior known process typically consumes substantial time and human resources because reviewers must substantively open, review, and comment on the extracted documents. In addition, vendors typically charge based on the size of the data files maintained for processing. The amount of data that is selected at this stage for manual processing, therefore, has a substantial impact on the overall cost of the review and production process.

In the prior known process, following this manual review process, selections (350) are made of appropriate documents that are being processed for production. These files would then be extracted from the second copy (352) and processed for production (354). This may include further substantive review for other issues as well as numbering of the documents to provide a record for the production.

In an embodiment of the present disclosure as depicted in FIG. 3B, in contrast, the volume of material extracted from the process is reduced early in the process. This has the beneficial effect of enabling the client to process large volumes of information without incurring substantial charges for subsequent processing. Rather than conducting the various review steps manually in the prior known process, the review is automated in an embodiment of the present disclosure, further reducing the client's, as well as the vendor's costs.

In an embodiment of the present disclosure, the file capture step is carried out similarly as in the prior known process. In this embodiment, the file capture is carried out physically at the client's location (362). Source files are copied to produce original image file set (364), which is then transferred to a processing location (366). Rather than extracting the data from the original image file set to container files as in the prior known process depicted in FIG. 3B, however, the original image file set is up-loaded to a web-based interactive application running on, for example, server 102, according to an embodiment of the present disclosure.

Alternatively, in an embodiment of the present disclosure, a data collection application may be installed directly on the target computer systems storing the source files. The target computer systems are then instructed to execute the application. The application conducts an inventory of the target computer systems and transfers a copy of all of the captured files to a web-based interactive application on server 102 for further processing. From this point forward in the processing, the subsequent processing steps are the same whether the data is captured by traditional means (362-366), or captured using a data collection application (370-372).

In contrast to the prior known process in which an Excel spreadsheet was provided and reviewed manually, the original image file set is up loaded to the web-based interactive application (374) according to process 360 and made available to the client to review electronically on the interactive application (376). Rather than simply designating categories of files or certain characteristics of files that are being selected for further processing, in an embodiment of the present disclosure, the web-based application allows the reviewer to select and modify interactive filters to be applied to the original image file set (378). This is done, preferably, directly on the web-based interactive application. The interactive filtering criteria may be set by the reviewer in the web-based application without going through each file in the original image file set. In an embodiment of the present disclosure, a second copy of the image file set need not be prepared or processed. Rather, the web-based application reads metadata from the original image file set without making additional copies. This further reduces data storage requirements and processing requirements and the potential for inadvertent errors in the copying process. The metadata includes, for example, forensic information about the documents in the original image file set, such as date of creation, date of last modification, creator of the document, present owner of the document, chain of custodian, file type, file location, directory structure associated with the document, etc. The web-based application may allow the review to set the interactive filters according to the individual fields or characteristics in the metadata. Steps 376 and 378 may be carried out by the reviewer iteratively until the reviewer is satisfied with the filtering criteria.

In a preferred embodiment of the present disclosure, the filters that are set by the reviewer are then applied (380), without further human intervention, to the original image file set. This process replaces the time-consuming and laborious process of manually reviewing the data, making specific selections of documents to be processed for production, and manually extracting the data to be produced. Rather, in a preferred embodiment of the present disclosure, based on the interactive filters applied by the reviewer, the web-based application automatically identifies and extracts filtered data (i.e., the filtered documents) from the original image file set and prepares the extracted documents for processing for production (382). The processing can then proceed by conducting any further review that is desired and by applying identifying numbers to the documents (384).

Figure 4:
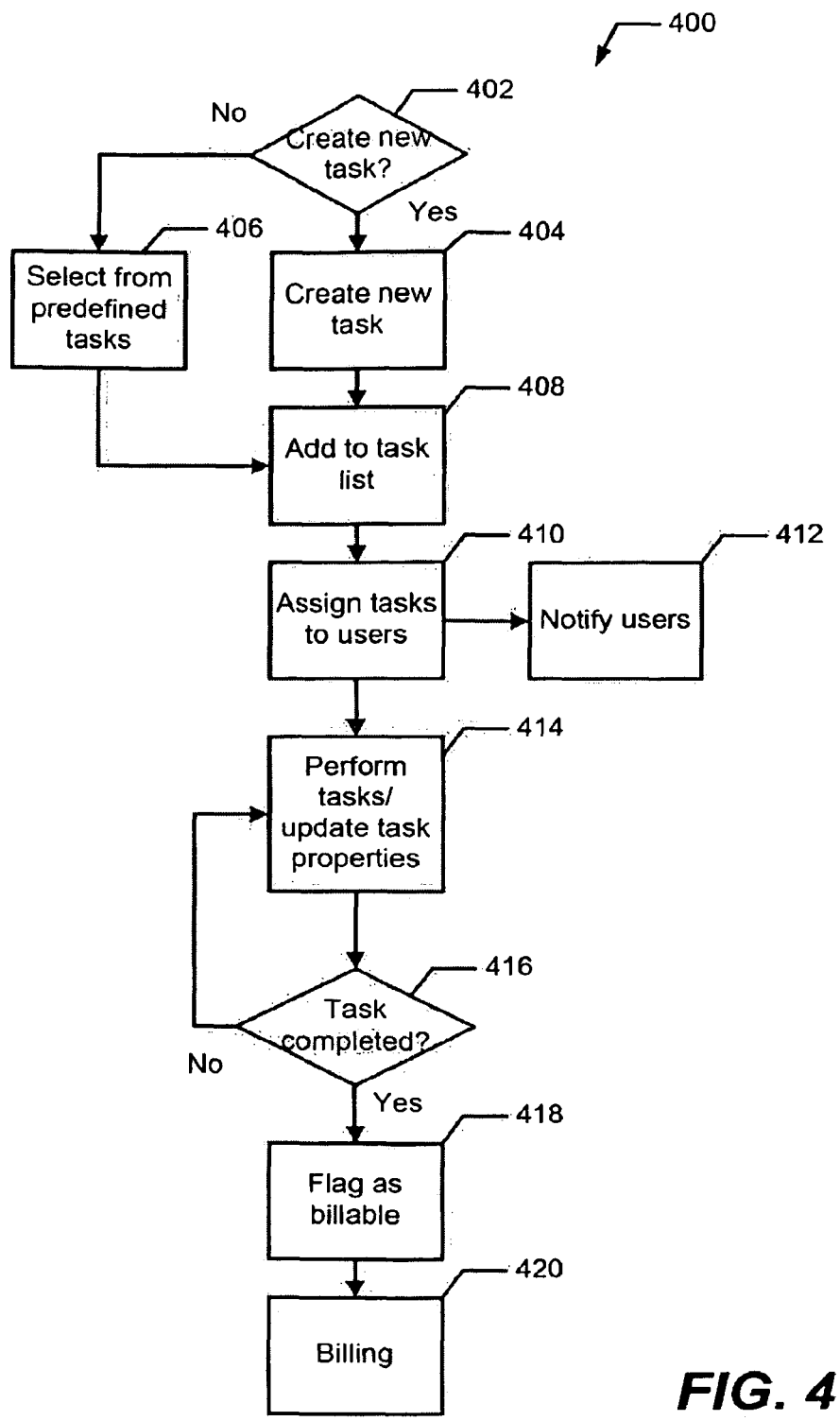
FIG. 4 is a flow chart of an exemplary process for managing tasks of processing the electronic documents.

FIG. 4 illustrates a flow chart of a process 400 for managing tasks of processing electronic documents. Process 400 may be implemented in task management and billing module 210 depicted in FIG. 2. A task may include one or more operations by server 102 related to the processing of the electronic documents. For example, a task may include one or more of the following operations: collecting electronic documents, scanning the electronic documents, cataloging the electronic documents, filtering the collected electronic documents, extracting the electronic documents, reviewing the electronic documents; production of the electronic documents, etc. A client, such as entity 113 or user 120, may be billed when a task is completed.

According to process 400, at step 402, task management and billing module 210 may determine whether a new task is to be created. Task management and billing module 210 may make the determination based on, for example, a user input including an instruction to create a new task.

When determining that a new task is desired, task management and billing module 210 creates a new task at step 404. Task management and billing module 210 may receive parameters of the new task from the user, including for example, a task name, a task description, types of documents to be processed, etc. On the other hand, when determining that a new task is not desired, task management and billing module 210 may select one of predefined tasks at step 406. The predefined tasks may be previously created by a user of system 100, such as user 120, sales person 124, agreement management person 128, or billing person 132.

At step 408, task management and billing module 210 may add the new task or the selected task to a task list. The task list may include all of the tasks to be performed for a client. At step 410, task management and billing module 210 may assign the tasks in the task list to individual users. The users may be user 120, sales person 124, agreement management person 128, billing person 132, or any other persons associated with entity 113 or server 102. When a task is assigned to a user, the user is in charge of managing the task and ensuring that the task is completed. At step 412, task management and billing module 210 may notified the users about the assignment. The notification may be an email message, a text message, or a message displayed through a user interface on a computing device.

At step 414, task management and billing module 210 may perform the tasks in the task lists. Task management and billing module 210 may periodically update the task properties as the tasks are being carried out. At step 416, task management and billing module 210 determines whether a task is completed. If not, task management and billing module 210 continues to process the task. If a task is completed, task management and billing module 210 may indicate a completed task to be billable by a flag at step 418. At step 420, the task management and billing module 210 creates a bill for the completed task and transmits the bill to the client.

Figure 5:
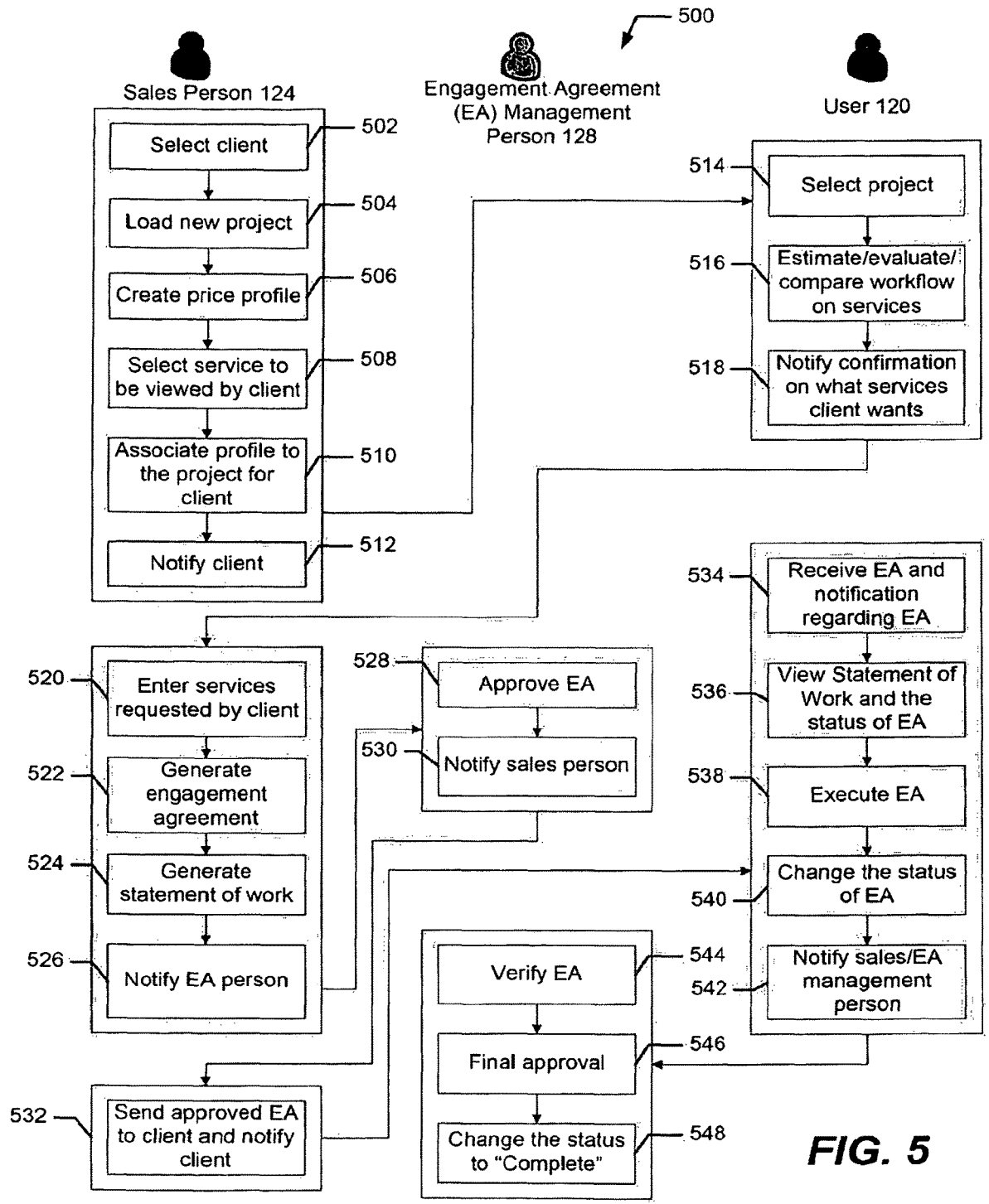
FIG. 5 is a flow chart of an exemplary process for managing an engagement agreement in connection with the processing of the electronic documents.

FIG. 5 depicts a flow chart of a process 500 for managing engagement agreements with clients requesting services from server 102. Process 500 may be implemented in task management and billing module 210 depicted in FIG. 2. Process 500 may facilitate collaborations among persons in three different roles, including sales person 124, engagement agreement management person 128, and user 120, who may be associated with entity 113 through employment or other service contracts. User 120 may be a client requesting document processing services from server 102. For example, user 120 may be an in-house legal staff of entity 113 or an external legal profession recruited by entity 113 for handing a discovery proceeding for a litigation case. Sales person 124 and engagement agreement management person 128 may be same or different persons associated with server 102, acting in different roles.

According to process 500, at step 502, task management and billing module 210 receives a user input from sales person 124 for selecting a client previously stored in server 102. Task management and billing module 210 may further prompt sales person 124 to update or fill in client information including, for example, a client name, client contact information, a client location, etc.

At step 504, task management and billing module 210 may load a project according to an input from sales person 124. Task management and billing module 210 may select a pre-define project or creating a new project based on the input from sales person 124. The input from sales person 124 may include for example, a project name, a description of the project, tasks, services, or workflows associated with the project, dates and times associated with the project, etc.

At step 506, task management and billing module 210 may create a price profile for the project. Task management and billing module 210 may prompt sales person 124 to provide detailed pricing information for the price profile including a base price per electronic document or per unit data volume, such megabyte (MG) or gigabyte (GB).

At step 508, task management and billing module 210 may select services, tasks, or workflows for the project to be viewed by the client. Task management and billing module 210 may receive user inputs from sales person 124 indicating that individual services, tasks, or workflows are to be viewed and selected by the client through the user interface.

At step 510, task management and billing module 210 may associate the price profile to the project. The association between the price profile and the project provides a link between the specific services, tasks, and workflows performed in connection with the project and a charge to be calculated and provided to the client when the services, tasks, or workflows are completed.

At step 512, task management and billing module 210 may notify the client through an email, a text message, or a message displayed through the user interface rendered on the computing device of the client. When the client (i.e., user 120) receives the notification from task management and billing module 210, a list of projects may be display to the client. At step 514, task management and billing module 210 may select one of the projects according to an input from the client.

At step 516, task management and billing module 210 may display a list of services, tasks, or workflows as defined in the selected project and estimate the costs of performing various combinations of the services, tasks, and workflows. Task management and billing module 210 may also provide evaluations of the time and labor needed to complete the project. Based on the estimates and evaluations, the client may compare various alternatives for carrying out the selected project.

At step 518, task management and billing module 210 may receive inputs from the client for selecting and confirming services, tasks, and workflows to be completed in the project. Task management and billing module 210 may then notify sales person 124 about the client's selection and confirmation through, for example, an email, a text message, or a message displayed through the user interface.

When sales person 124 receives the notification from the client regarding the selected services, tasks, and workflows, task management and billing module 210 may receive inputs from sales person 124 for entering and finalizing the client-requested services, tasks, and workflows in the project at step 520. At step 522, task management and billing module 210 may generate an engagement agreement based on the user-requested services. Task management and billing module 210 may prompt sales person 124 to enter provisions of the engagement agreement through the user interface. Alternatively, task management and billing module 210 may load a pre-drafted engagement agreement from a document stored in server 102 or the computing device of sales person 124. The engagement agreement may specify details of the services, tasks, and workflows requested by the client and the pricing information defined in the price profile.

At step 524, task management and billing module 524 may generate a Statement of Work including detailed descriptions of the project and the services, tasks, and workflows to be performed by server 102 in connection with the processing of the electronic documents. Task management and billing module 524 may incorporate the Statement of Work in the engagement agreement. At step 526, task management and billing module 210 may notify engagement agreement management person 128 about the draft of the engagement agreement through an email, a text message, or a message displayed through a user interface.

When engagement agreement management person 128 receives the notification about the engagement agreement, engagement agreement management person 128 may instruct server 102 to display the engagement agreement on a computing device. Engagement agreement management person 128 may then review and approve the engagement agreement at step 528. Upon receiving the approval from engagement agreement management person, task management and billing module 210 may notify sales person 124 about the approval through an email, a text message, or a message displayed through a user interface.

When sales person 124 receives notification about the approval from engagement agreement management person 128, sales person 124 may instruct task management and billing module 210 to send the approved engagement agreement to the client and notify the client about the engagement agreement. Task management and billing module 210 may send the approved engagement agreement by storing the agreement document to an account on server 102 associated with the client. The client may then access and review the approved engagement agreement by logging into the account. Task management and billing module 210 may also send the approved engagement agreement in the form of, for example, PDF or WORD document through an email attachment. The client may review the approved agreement on a computing device or print it out for review. Task management and billing module 210 may also print out the approved agreement, which is sent to the client through a postal mail.

At step 534, the client receives the engagement agreement and the notification regarding the engagement agreement. At step 536, the client may view the Statement of Work incorporated in the engagement agreement. Task management and billing module 210 may cause the computing device associated with the client to display a status of the engagement agreement. The status may indicate that the engagement agreement as incomplete, pending approval, approved, executed, or complete. At step 538, the client may choose to execute the agreement. Alternatively, the client may choose to modify the agreement or negotiate the pricing of the services with sales person 124 before executing the agreement.

The client may execute the agreement by signing a print-out copy and then scanning the signed document to a computing device. The computing device may then transmit the signed document to server 102 which associates the signed document with the account of the client. Alternatively, the client may execute the agreement by electronic means. For example, after the client review the entire agreement on a computing device, task management and billing module 210 may cause the computing device to display a message prompting the client to electronically sign the agreement. Still alternatively, the client may simply mail the signed document to sales person 124, who may then upload a scanned copy of the signed document to server 102 and associate the signed document with the account of the client.

At step 540, when the client executes the engagement agreement properly, task management and billing module 210 may change the status of the engagement agreement to indicate the execution of the agreement by the client. At step 542, task management and billing module 210 may notify sale person 124 or engagement agreement management person 128 about the executed agreement.

Upon receiving the notification about the executed agreement from the client, engagement agreement management person 128 may verify the agreement and the signature of the client at step 544. At step 546, engagement agreement management person 128 may perform a final approval of the agreement by co-signing the agreement. Similarly, engagement agreement management person 128 may co-sign the agreement through electronic means or on a print-out copy, which may be scanned and transmitted to server 102. When engagement agreement management person 128 completes the final approval, task management and billing module 210 may change the status of the agreement to the "Complete" status, which indicates that the agreement has been properly approved and executed by both the client and engagement agreement management person 128. Thereafter, server 102 may start the processing of the electronic documents as described above in accordance to the services, tasks, and workflows specified in the engagement agreement.

It is understood that the orders of the steps of the processes described above are not limited to those depicted in FIGS. 3-5. One of ordinary skill in the art would recognize that the steps may be performed in different orders while still retaining the benefits of the disclosure.

Figure 10:
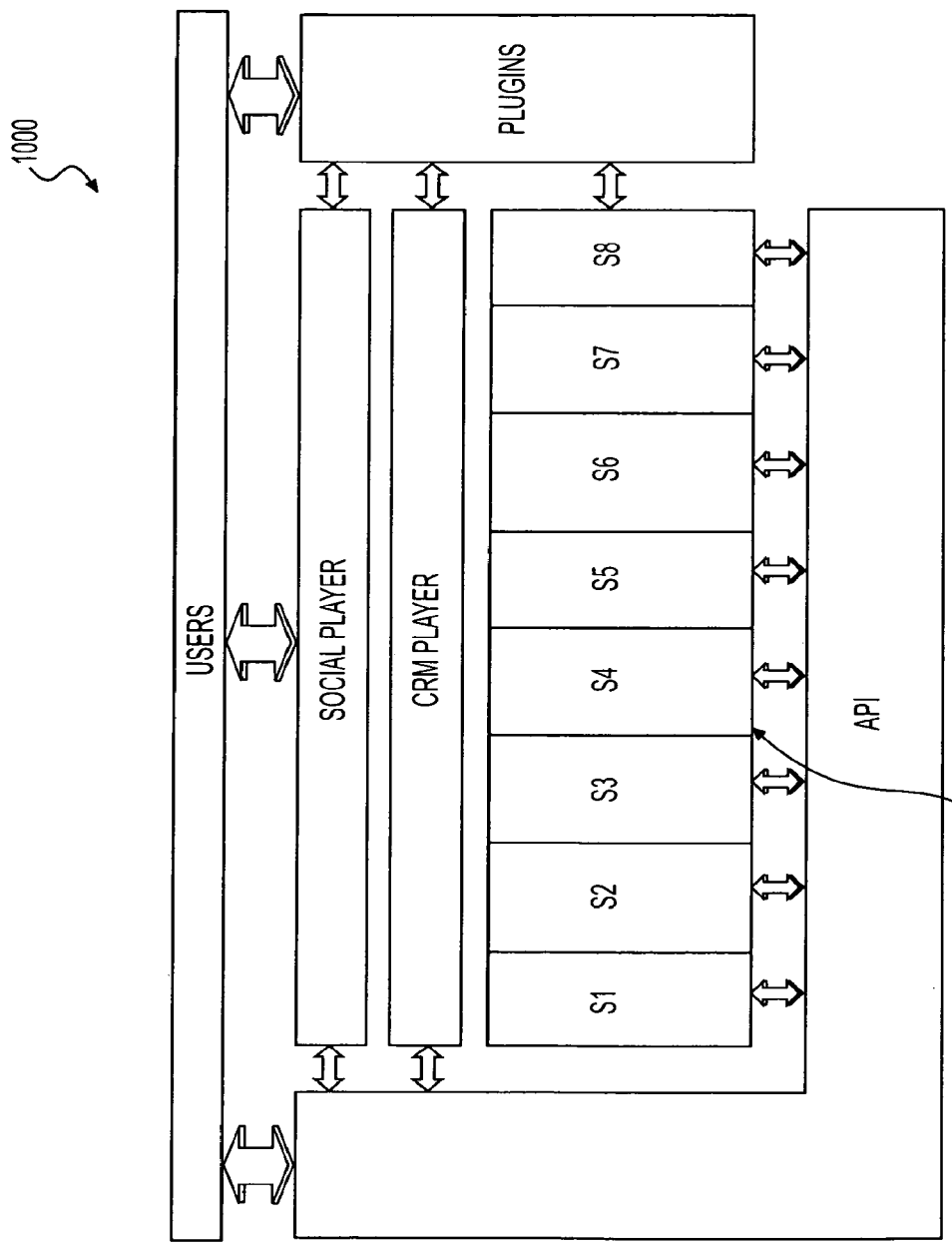
FIG. 10 is a block diagram of a system for processing electronic documents according to another embodiment.
Figure 11:
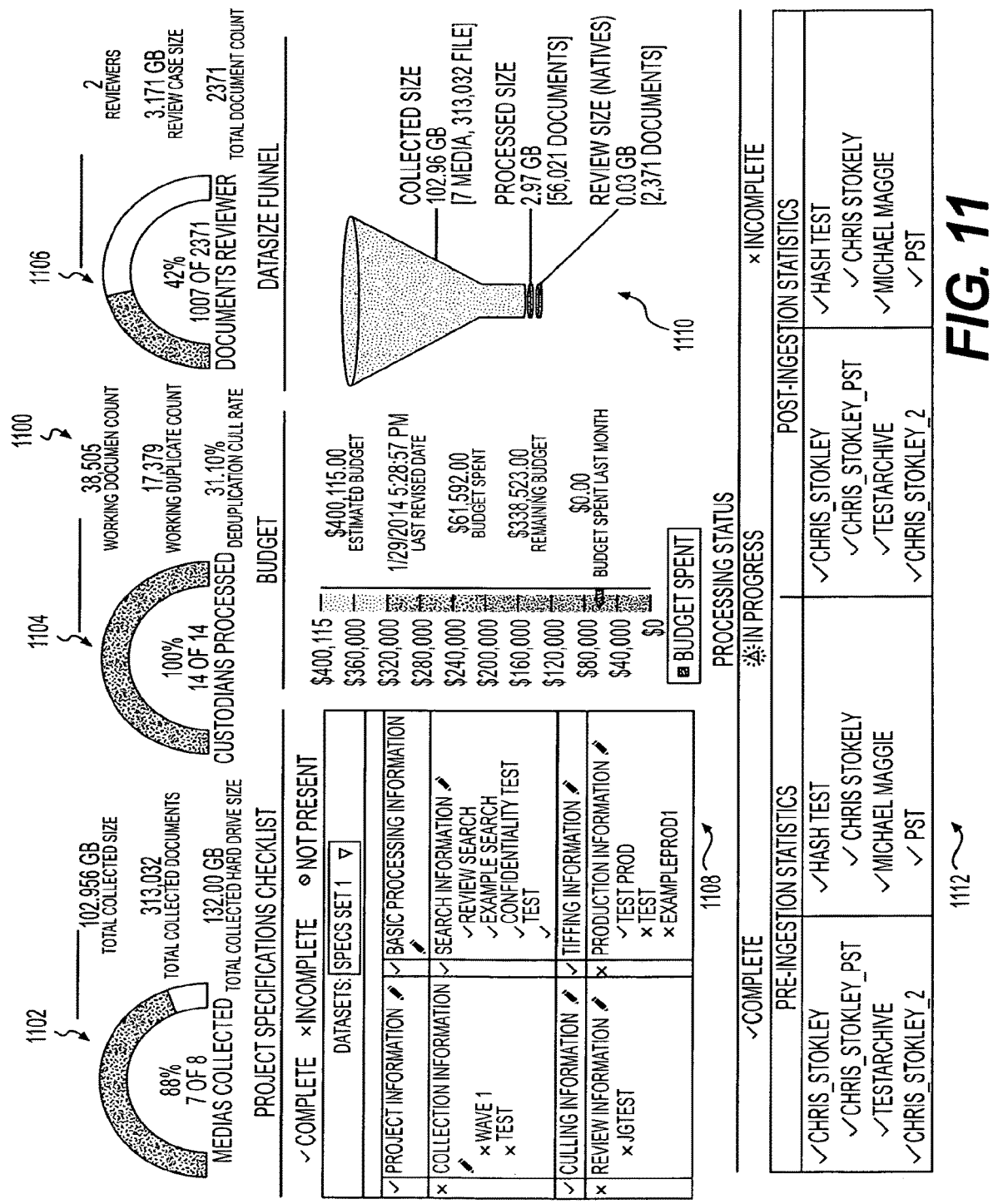

FIG. 10 is a block diagram of a system 1000 according to another embodiment for processing electronic documents. System 1000 may be a Software-as-a-Service (SAAS) based web system that provides clients or customers with management tools to carry out the processes defined in an Electronic Discovery Reference Model (EDRM). System 1000 may allow a client to carry out the processing from start (Stage 1 or S1) to end (Stage 8 or S8) in a highly intuitive, scalable, secure, easy to use and deploy, enterprise level environment. System 1000 may further include a client-relationship module (CRM) that provides a holistic view to each customer enabling the customer to make expedited and educated business and technology decisions on a strategic and tactical level to manage their own clients. All of these processes can be shared between different people involved in a matter or otherwise via social collaboration provided in the Social Layer. External companies can build their applications on top of this system 1000 to implement additional features or present the current data available to them in a desired way using the Application Programming Interface (API).

System 1000 may include an e-Discovery Layer. The e-Discovery layer may be at the base of the model. This block is an end-to-end process for performing e-Discovery processes defined in the Electronic Discovery Reference Model (EDRM). It may be divided into a plurality of stages (for example, S1-S8), including Information Management, Identification, Collection, Processing, Review, Analysis, Production & Presentation, etc. Depending on the nature and need, data can reside at any of these stages. Each stage provides a workflow to handle the data and perform their corresponding function as described in the Electronic Discovery Reference Model (EDRM). This may also be a tactical level layer.

System 1000 may include a CRM Layer. This layer formulates the Customer Relationship Management Process. This layer may support interaction between customer and company at a service or sales level, including, but not limited to, lead generation, client conversion, opportunities, cases or projects (each case or project can have any or all of the 8 layers from the e-discovery layer), billing, file sharing, analytics and budgeting. This layer may help clients make their business decisions based on the results from the E-discovery layer. This is a strategic level layer.

System 1000 may include a Social Layer. This layer may allow different clients to share information with people involved in the project using the social tools. The e-Discovery layer and CRM layer data may be shared between different people with the help of the Social Layer. This includes, without limitation, sharing and collaborating on reports, dashboards, project information, and CRM information using social media tools including chat, tweet, tagging, feeds, rating, posts, and linking.

System 1000 may include User Layer. This layer may provide interactions between the "outside world" and the SAAS platform (i.e., system 1000). This may include users logging in via the Internet, smart phones, PDA, or other electronic devices, which may provide direct or indirect access to the platform.

System 1000 may include an API Layer. This layer may allow the "outside world" to send or retrieve information from the system 1000. Here the "outside world" may make use of the API provided by the system 1000 to communicate with it. The information involves but is not limited to data being imported and exported from the different EDRM stages and the different CRM layer.

System 1000 may include a Plugin Layer. Plugin Layer may allow the "outside world" to create their own applications that sit on top of one or more of the Social, CRM, and e-Discovery layers and provide new or added functional capabilities to the end user using the system 1000.

Although the processing of the electronic documents is described in the context of a discovery proceeding in a litigation case, other embodiments of the invention will be apparent to those skilled in the art from consideration of the specification and practice of the embodiments disclosed herein. For example, the system and method disclosed herein may be used for document and data mining in a process that requires processing of a large amount of electronic documents stored in various file systems. Because system 100 may extract and analyze forensic information about the electronic documents before extracting and producing the contents of the electronic documents, system 100 allows user 120 and entity 113 to correctly estimate and assess the costs associated with a discovery process. Compared with conventional discovery system, system 100 provides more accurate evaluations and estimates of the time and labor required by a discovery process before incurring substantial costs for reviewing and producing the electronic documents.

FIGS. 11-17 illustrate various user interfaces generated by system 100 according to alternative embodiments. Similar to user interface 800 discussed above, interface 1100, as shown in FIG. 11, presents various real-time status information of the electronic documents being processed by system 100. For example, status bars 1102, 1104, and 1106 provide visual indications of the progress of the document processing, including the percentage of media that have been collected, the percentage of the document custodians that have been processed, and the percentage of the total documents that have been reviewed.

Interface 1100 may further include a graphical element 1110 showing comparisons of the electronic documents at different processing stages. For example, graphical element 1100 may include a funnel shape with numerical values indicating a size of the electronic documents before collection, a size of the electronic documents after collection, and a size of the electronic documents after processing. Graphical element 1110 may provide a visual indication as to the amount of the electronic documents that are being retained and filtered out during the processing of the electronic document.

Interface 110 may further include budgetary information 1108 of a particular project. The budgetary information 1108 may show the estimated budget for the document processing project, the last revised date, the budget that has been spent, the remaining budget, and the budget spent last year/month/week/day. The budgetary information 1108 provides a direct visual feedback for the user to compare and control the budget spent on the project.

Interface 1100 may further present the processing status of various projects and tasks. Each project or task may be assigned an identification. An indication may be displayed for each project or task, indicating whether the project or task is complete, in-progress, or incomplete. The information presented by interface 110 is updated in real time as the documents are being processed by system 100.

Figure 12:
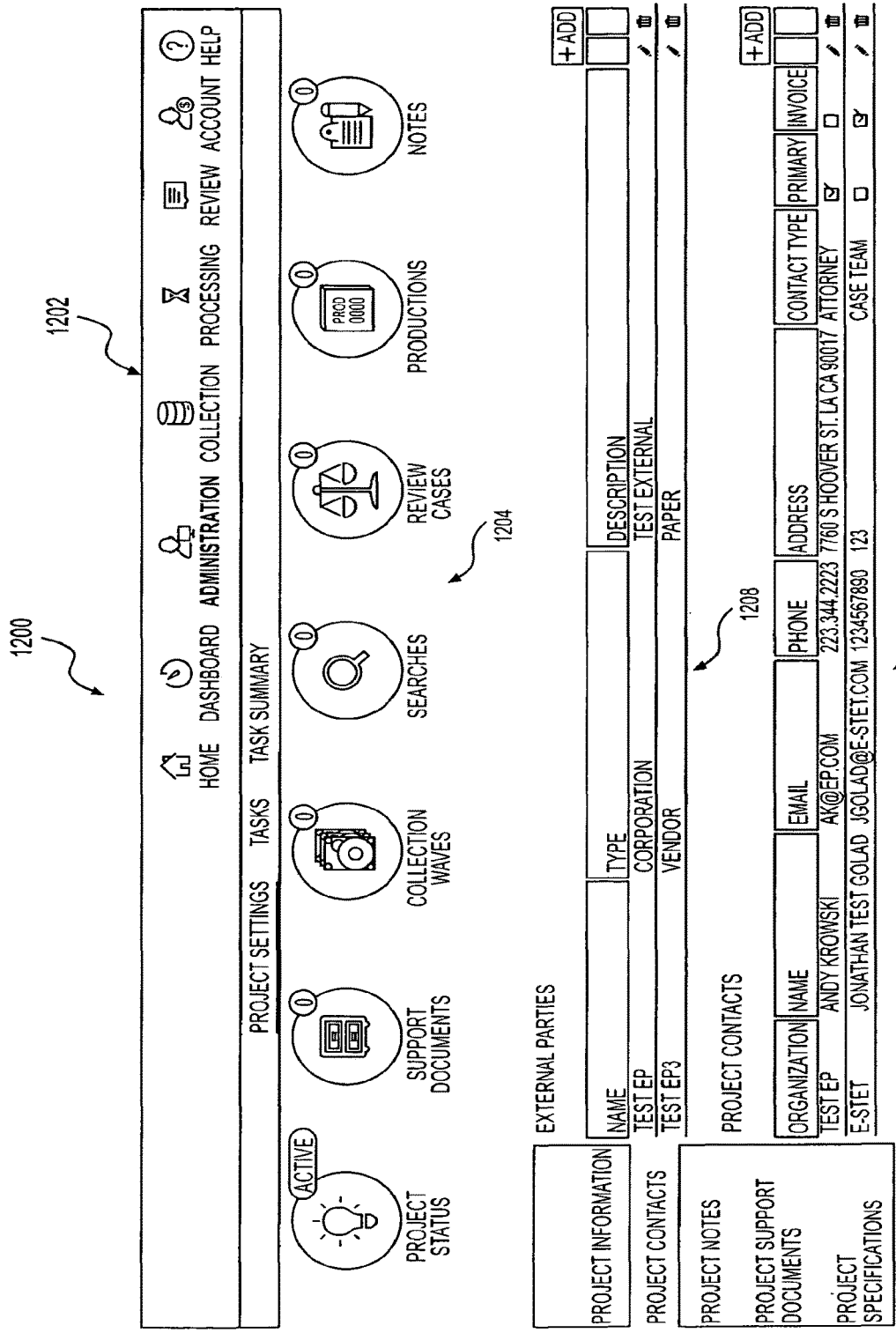

System 100 may also generate an interface 1200 as shown in FIG. 12. Interface 1200 includes a plurality of top-level menu options 1202, such as "Home," "Dashboard," "Administration," "Collection," "Processing," "Review," "Account," and "Help." When one of the top-level menu options 1202 is selected by a user via an input device, the rest of the interface 1200 presents information related to the selected top-level menu option. For example, the when the "Administration" menu is selected, interface 1202 presents a group of indicators 1204 showing the project status, the number of support documents for the project, the number of collection waves that have been completed, the number of searches that have been conducted, the number of cases that have been reviewed, the number projects that have been generated, and relevant notes made for the project.

Under the "Administration" menu, interface 1200 may further display additional project-related information 1206, including, for example, general project information, project contacts, project notes, project support documents, and project specifications. When a user selects the "project contacts" tab, for example, interface 1200 shows a list of external parties 1208 that are related to the project and a list of project contacts 1210 associated with the external parties 1208. The contact information my include organization, name, email, phone number, address, and contract type. The contacts may be primary contacts or invoice contacts, to whom an invoice is to be directed.

Figure 13:
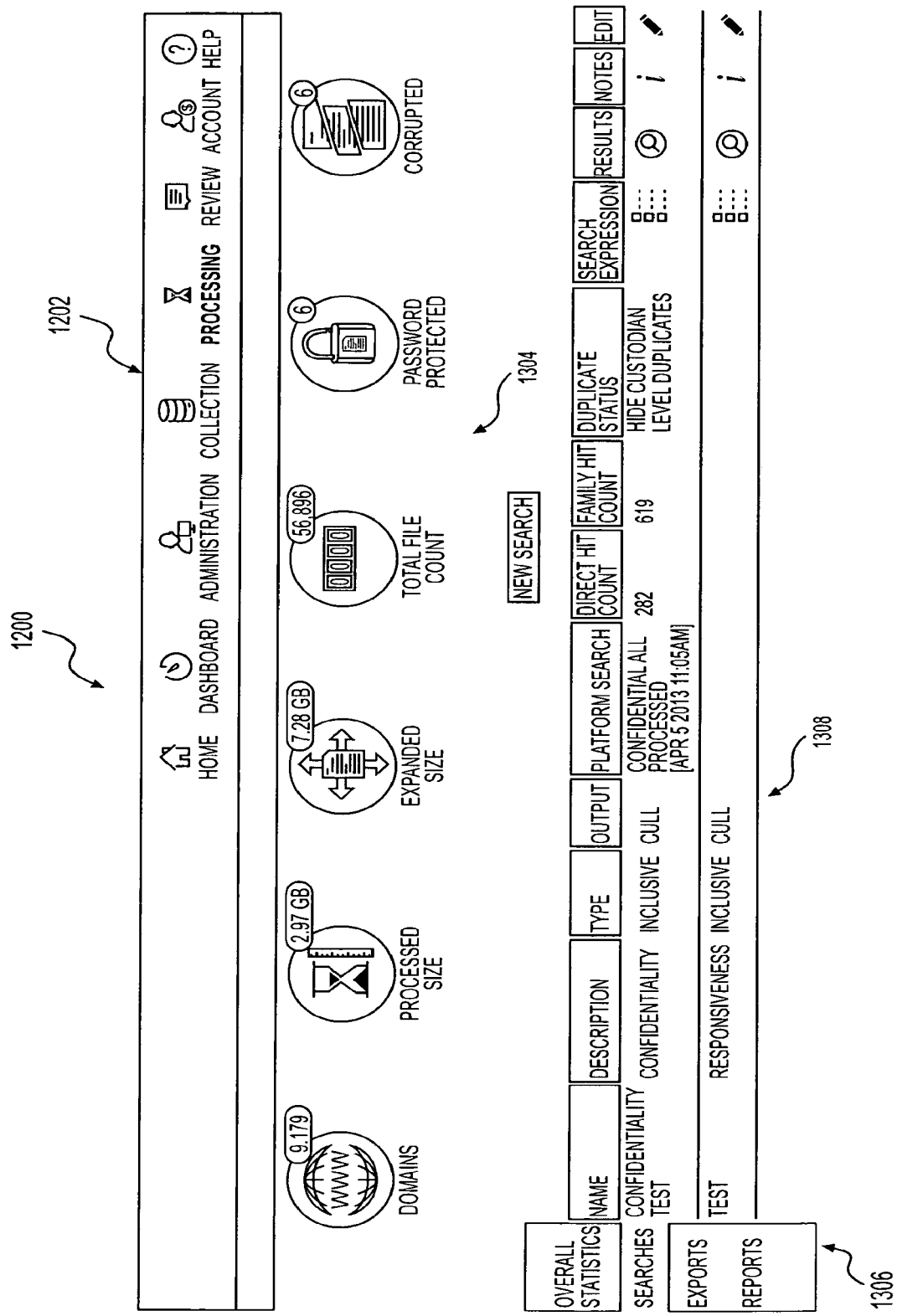

As shown in FIG. 13, when a user selects the "Processing" menu from the top-level options 1202, interface 1200 presents a group of indicators 1304 showing the number of domains in the current collection of documents, the size of the documents that have been processed, the expanded size of the documents in the collection, the total number of files in the collection, the number of documents that are password protected, and the number of documents that are corrupted.

Under the "Processing" menu, interface 1200 may further present a list of menus 1306, including "Overall Statistics," "Searches," "Exports," an "Reports." For example, when the user select the "Searches" menu, interface 1200 presents a list of searches 1308 that have been conducted. Search list 1308 may show information of the searches, including, for example, a search name, a search description, a search type, a search output, etc. Search list 1308 may include active links under, for example, the 'Results" column, the "Notes" column, and the "Edit" column. When the user selects the active link under the "Results" column, interface 1200 may generate the search results according to the search definition. When the user selects the active link under the "Notes" column, interface 1200 may display the notes associated with the search. When the user selects the active link under the "Edit" column, interface 1200 may allow the user to edit the selected search.

Figure 14:
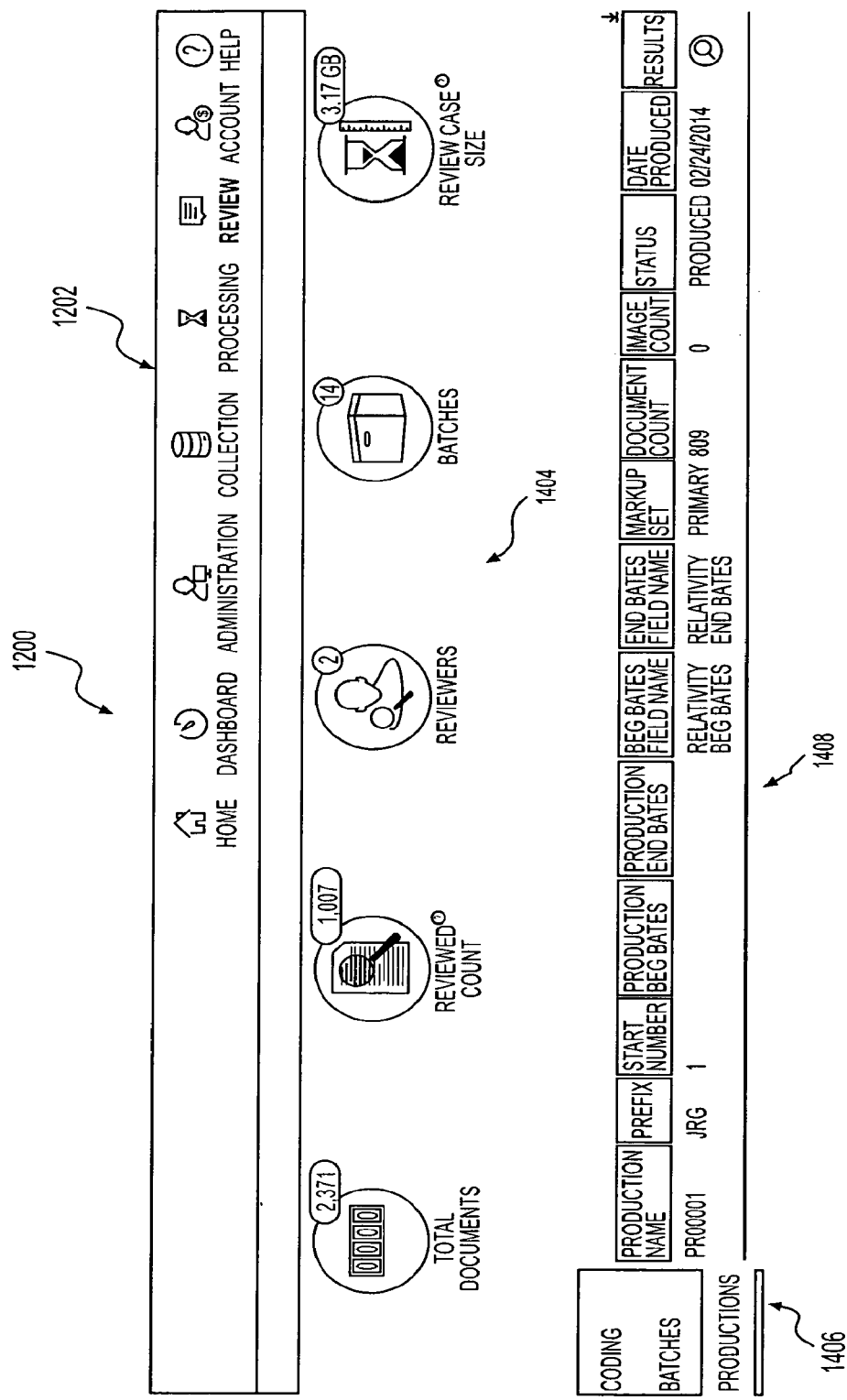

As shown in FIG. 14, when the user selects the "Review" tab from the top-level menu options 1202, interface 1200 presents a group of indicators 1404 related to document review. These indicators 1404 include, for example, the total number of documents under review, the number of documents that have been reviewed, the number of reviewers assigned to the reviewing task, the number batches of documents under review, and the size of the documents under review.

Under the "Review" menu, interface 1200 may further present a list of menus 1406, including "Coding," "Batches," and "Productions." When the user selects the "Productions" menu, for example, interface 1200 presents a list of document productions 1408. The production list 1408 may include information, such as the production name, the prefix, the start number, the production beginning bates, the production ending bates, the beginning bates field name, the ending bates field name, the markup set, the document count, the image count, the status of the production, the date of the production, and the results of the production. The user may further click an active link under the "Results" column to further display detailed results of the production run.

Figure 15:
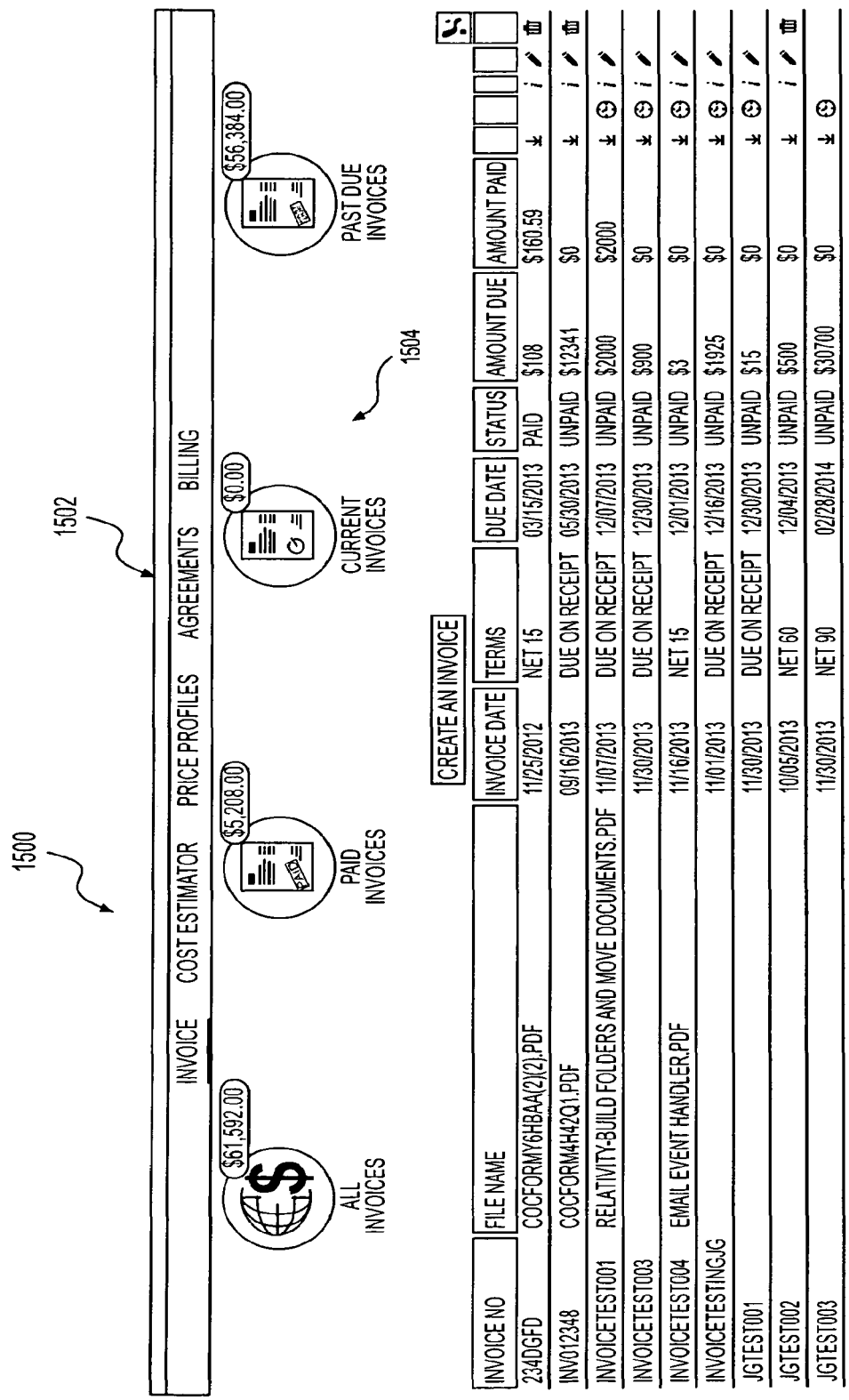

FIG. 15 illustrates an invoice interface 1500 generated by system 100, according to an embodiment. Invoice interface 1500 allows a user to prepare, manage, and transmit invoices for individual projects and tasks that have been completed. Invoice interface 1500 includes a set of top-level menu options 1502, such as "Invoice," "Cost Estimator," "Price Profiles," "Agreements," and "Billing." The user may select one of the menu options to according to needs. For example, when the user selects the "Invoice" menu, interface 1500 may present a group of indicators 1504 showing the number of all invoices, the number of paid invoices, the number current invoices that are outstanding, and the number of past due invoices. When the user selects one of the indicators 1504, interface 1500 may further display a list of individual invoices 1506 associated with that indicator. The invoice list 1506 may show information such as invoice number, invoice file name, invoice date, invoice term, due date of the invoice, status of the invoice, amount due specified in the invoice, and amount paid. The user may also download, edit, or delete the individual invoices.

In addition, system 100 also allows the user to manage the invoices for individual document processing tasks. As shown in FIG. 16, system 100 may generate an interface 1600 including a set of tabs 1602, which are associated with different categories of tasks, such as billable tasks, approved tasks, and un-invoiced tasks. When the user selects one of the tabs 1602, interface 1600 presents a list of tasks in that category.

When a user selects the "Billable Tasks" tab, as shown in FIG. 16, interface 1600 presents a list of tasks 1604 that have been completed and become billable. The list may show information, such as "Task ID," "Client Name," "Project Name," "Task Name," "Service Name," "Billing Date", "Billed Hour," "Billed Count," "Service Prices," "Billed Amount," a description of the billable task, and the person assigned to the task. In addition, list 1604 may further allow the user to edit the individual billable tasks and approve the tasks. When a task is approved, the task will be included in the "Approved Tasks" tab. A user may then select the "Approved Tasks" tab to review all approved tasks.

As another example, as shown in FIG. 17, when a user selects the "Un-Invoiced Tasks" tab, interface 1600 may display a list of tasks 1704 that have been approved but have not been invoiced. The list may show information, such as "Task ID," "Client Name." "Project Name," "Task Name," "Service Name," the name of the person who completed the task, the billing date, the billed count, a description of the task, the billed amount, the person who approved the task, and the date of approval. The user may then manage the un-invoiced tasks accordingly and transmit them to the clients for billing if desired.

The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for processing electronic documents, comprising:
   receiving a plurality of electronic documents;
   storing, in a storage medium, the electronic documents in file containers configured to preserve the integrity and authenticity of the electronic documents;
   retrieving metadata from the storage medium without extracting the plurality of electronic documents from the storage medium, the metadata indicating forensic information about the plurality of electronic documents;
   indexing the electronic documents based on the retrieved metadata;
   automatically filtering the electronic documents based on the retrieved metadata;
   presenting the metadata to a user for review;
   setting an interactive filter according to user inputs received through a user interface that indicate a selection of forensic information of the electronic documents and include at least a filtering criterion;
   applying, by a computer without human intervention, the interactive filter to the electronic documents to generate filtering results based on the filtering criterion;
   storing the filtering results in a queue for processing, the filtered metadata identifying a selected set of the electronic documents; and
   selectively extracting, without human intervention, one or more electronic documents from the storage medium based on the stored filtering results.

2. A computer-readable medium including computer instructions, which, when executed by a processor, causes the processor to perform a method for processing electronic documents, the method comprising:
   receiving a plurality of electronic documents;
   storing, in a storage medium, the electronic documents in file containers configured to preserve the integrity and authenticity of the electronic documents;
   retrieving metadata from the storage medium without extracting the plurality of electronic documents from the storage medium, the metadata indicating forensic information about the plurality of electronic documents;
   indexing the electronic documents based on the retrieved metadata;
   automatically filtering the electronic documents based on the retrieved metadata;
   presenting the metadata to a user for review;
   setting an interactive filter according to user inputs received through a user interface that indicate a selection of forensic information of the electronic documents and include at least a filtering criterion;
   applying, by a computer without human intervention, the interactive filter to the electronic documents to generate filtering results based on the filtering criterion;
   storing the filtering results in a queue for processing, the filtered metadata identifying a selected set of the electronic documents; and
   selectively extracting, without human intervention, one or more electronic documents from the storage medium based on the stored filtering results.

3. A computer system for processing electronic documents comprising:
   a storage medium for storing computer instructions for processing a plurality of electronic documents; and
   a processor for executing the computer instructions, the computer instructions causing the processor to:
   receive a plurality of electronic documents;
   store, in a storage medium, the electronic documents in file containers configured to preserve the integrity and authenticity of the electronic documents;
   retrieve metadata from the storage medium without extracting the plurality of electronic documents from the storage medium, the metadata indicating forensic information about the plurality of electronic documents;
   index the electronic documents based on the retrieved metadata;
   automatically filter the electronic documents based on the retrieved metadata;
   present the metadata to a user for review;
   set an interactive filter according to user inputs received through a user interface that indicate a selection of forensic information of the electronic documents and include at least a filtering criterion;

apply, by a computer without human intervention, the interactive filter to the electronic documents to generate filtering results based on the filtering criterion;

store the filtering results in a queue for processing, the filtered metadata identifying a selected set of the electronic documents; and selectively extract, without human intervention, one or more electronic documents from the storage medium based on the stored filtering results.

4. The method of claim 1, further comprising determining the forensic information about the plurality of electronic documents by analyzing the metadata.

5. The method of claim 1, wherein the filtering criterion includes at least one of a document name, a document type, a folder name, a custodian name, a file extension, a domain name, a date range, a time range, or a keyword.

6. The method of claim 1, further comprising presenting the filtering results to a user through a user interface.

7. The method of claim 1, further comprising:
presenting the selectively extracted electronic documents to a user for review.

8. The computer-readable medium of claim 2, wherein the user interface comprises a remote computer user interface for presenting the forensic information about the plurality of electronic documents and the selectively extracted electronic documents to a user.

9. The computer-readable medium of claim 2, wherein the method further comprises presenting the filtering results to the user in substantially real time through the user interface.

10. The computer system of claim 3, wherein the selected set of the electronic documents is an image file generated based on a file system associated with the storage medium.

11. The computer system of claim 3, wherein the electronic documents available to the user further includes presenting the metadata to the user through a web-based application.

12. The computer system of claim 3, wherein the metadata includes at least one of a document name, a document type, a file extension, a creation date and time, a last modified date and time, an indication of whether the electronic documents have been deleted, a number of all of the electronic documents, a size of all of the electronic documents.

13. The method of claim 4, wherein the forensic information about the plurality of electronic documents includes a list of folders storing the electronic documents and structural relationships of the folders, the structural relationships of the folders corresponding to a file system in which the electronic documents were created.

14. The method of claim 6, further comprising presenting the filtering results in substantially real time.

15. The method of claim 6, further comprising:
receiving an additional user input for adjusting the filtering result, the additional user input inducting an additional filtering criterion different from the filtering criterion; and filtering the electronic documents according to the additional filtering criterion.

16. The method of claim 7, further comprising:
generating a graphical element representing a statistical characteristic of the selectively extracted electronic documents.

17. The method of claim 13, wherein the forensic information about the plurality of electronic documents further includes a list of electronic documents stored within each folder.

18. The method of claim 17, wherein the forensic information about the plurality of electronic documents further includes at least one of a document name, a document type, a file extension, a creation date and time, a last modified date and time, an indication of whether the electronic documents have been deleted, a number of all of the electronic documents, and a size of all of the electronic documents.

19. The method of claim 17, further comprising:
presenting the forensic information about the plurality of electronic documents to a user through a user interface generated by a web-based application.

* * * * *